(12) United States Patent
Yoshida

(10) Patent No.: US 11,010,189 B2
(45) Date of Patent: May 18, 2021

(54) MULTI-CLOUD OPERATING METHOD, OPERATION MANAGING DEVICE, AND STORAGE MEDIUM

(71) Applicant: FUJITSU LIMITED, Kawasaki (JP)

(72) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 16/449,625

(22) Filed: Jun. 24, 2019

(65) Prior Publication Data

US 2020/0065129 A1 Feb. 27, 2020

(30) Foreign Application Priority Data

Aug. 21, 2018 (JP) .............................. JP2018-154784

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| 2010/0246443 | A1 | 9/2010 | Cohn et al. |
| 2015/0372938 | A1 | 12/2015 | Patel et al. |
| 2018/0270084 | A1* | 9/2018 | P Zm Ny ............ H04L 12/4633 |
| 2019/0268262 | A1* | 8/2019 | Wang ..................... H04L 49/70 |
| 2019/0317783 | A1* | 10/2019 | Lemay ................ G06F 9/45533 |

FOREIGN PATENT DOCUMENTS

| JP | 2012-519458 | 8/2012 |
| JP | 2013-134658 | 7/2013 |
| JP | 2017-519309 | 7/2017 |

* cited by examiner

*Primary Examiner* — Charlie Sun
(74) *Attorney, Agent, or Firm* — Fujitsu Patent Center

(57) ABSTRACT

A non-transitory computer-readable storage medium storing a program that causes a computer to execute a process, the process includes storing a port number of a first service used by a first virtual machine executed within a first cloud computing system in association with an identifier of the first virtual machine; when receiving a request to move the first virtual machine to a second cloud computing system, transmitting a confirmation request as to whether or not a second service corresponding to the port number of the first service is enabled to be used in the second cloud computing system to the second cloud computing system, the confirmation request specifying the port number of the first service; and moving the first virtual machine to the second cloud computing system when receiving a reply indicating that the second service is enabled to be used from the second cloud computing system.

13 Claims, 17 Drawing Sheets

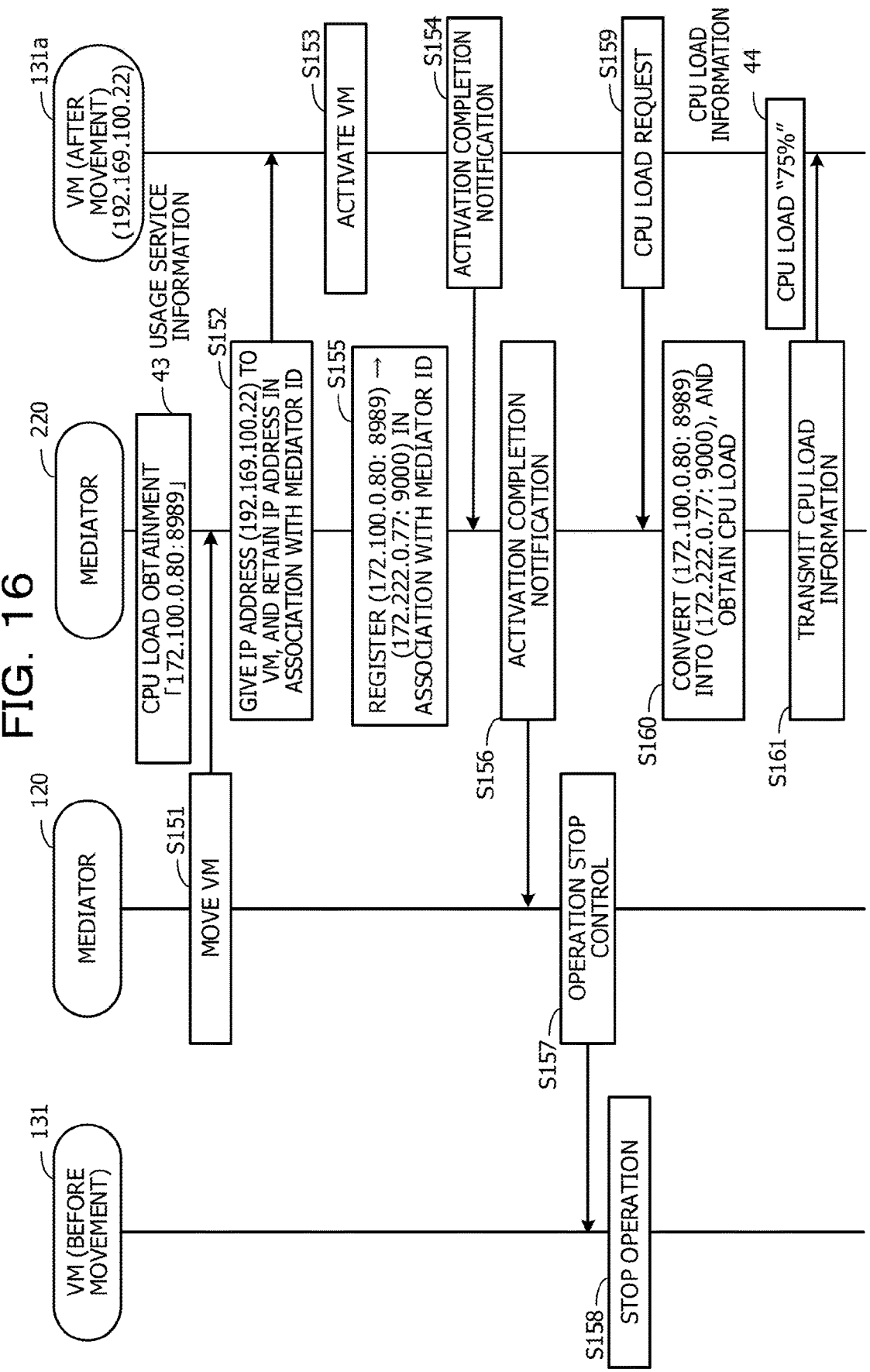

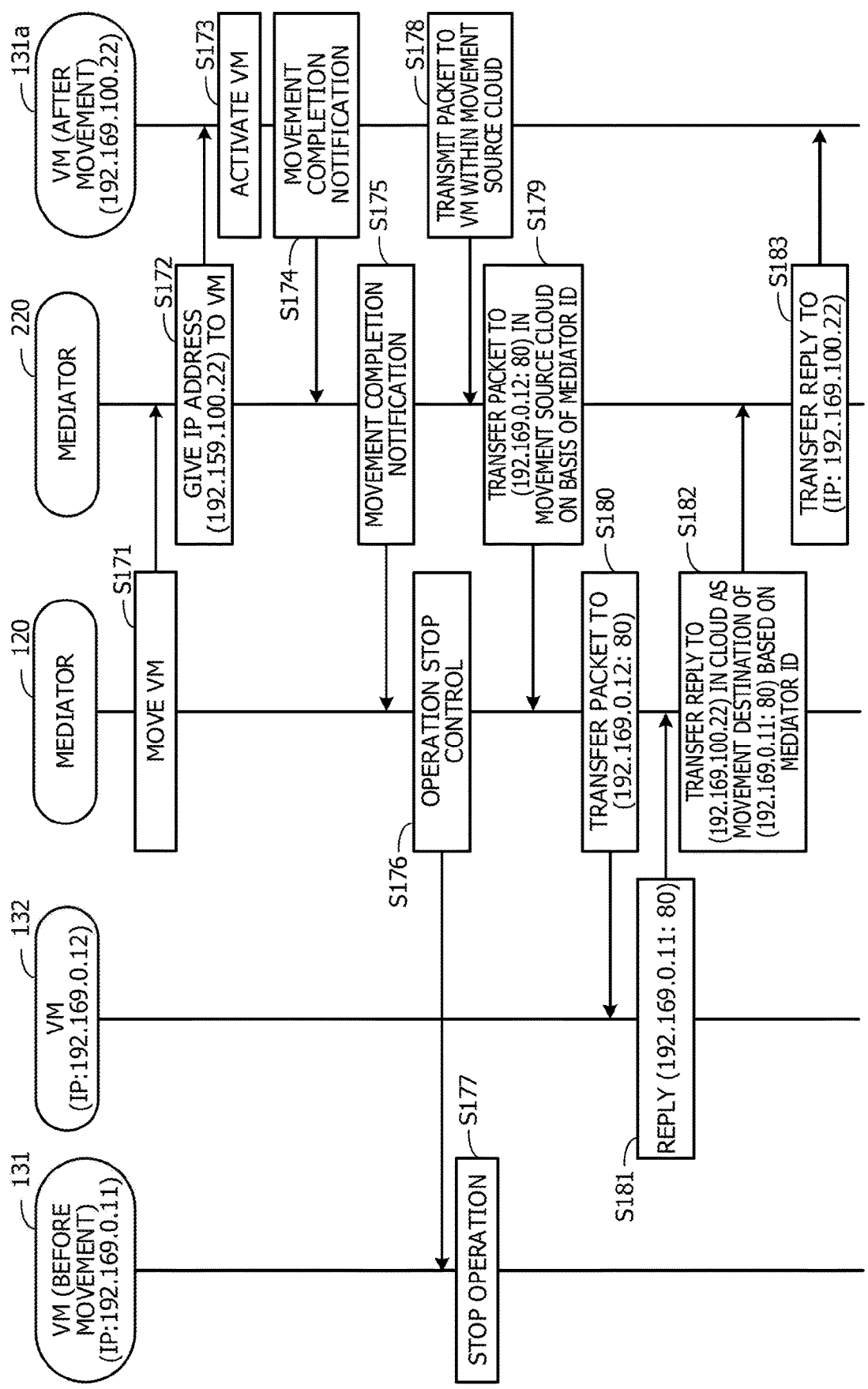

MULTI-CLOUD OPERATING METHOD, OPERATION MANAGING DEVICE, AND STORAGE MEDIUM

CROSS-REFERENCE TO RELATED APPLICATION

This application is based upon and claims the benefit of priority of the prior Japanese Patent Application No. 2018-154784, filed on Aug. 21, 2018, the entire contents of which are incorporated herein by reference.

FIELD

The embodiments discussed herein are related to a multi-cloud operating method, an operation managing device, and a storage medium.

BACKGROUND

A user using a cloud computing system (that may hereinafter be referred to simply as a cloud) may use a plurality of clouds provided by different companies. In this case, the user constructs a system straddling the plurality of clouds (multi-cloud system).

The user using the multi-cloud system operates a virtual machine (VM) in each of the plurality of clouds. The VM may be referred to as an instance. The user makes desired processing performed, by making the plurality of VMs executed in the different clouds operate cooperatively.

As a technology for managing a VM in a cloud, there is, for example, a system for partition migration in a multi-tenant application server environment. In addition, there is a computer network system capable of managing virtual connection of a virtual machine. Further, there is also a technology providing a logical networking function for a managed computer network such as a virtual computer network provided for a user or another entity. Disclosed as related art are Japanese National Publication of Patent Application No. 2017-519309, Japanese Laid-open Patent Publication No. 2013-134658, Japanese National Publication of Patent Application No. 2012-519458, and the like.

In the multi-cloud system, a VM may be moved so as to straddle clouds. However, there is no means for confirming before the movement that processing like processing performed by the VM to be transferred before the movement may be performed by the VM after the movement. There is, for example, a case where a service used by the VM to be moved in a cloud before the movement is difficult to use in a cloud as a movement destination. In such a case, it is difficult for the VM to be moved to perform, after the movement, processing like that before the movement. In view of the above, it is desirable to be able to confirm whether the VM may continue the processing after the movement.

SUMMARY

According to an aspect of the embodiment, a non-transitory computer-readable storage medium storing a program that causes a computer to execute a process, the process includes storing a port number of a first service used by a first virtual machine executed within a first cloud computing system in association with an identifier of the first virtual machine; when receiving a request to move the first virtual machine to a second cloud computing system, transmitting a confirmation request as to whether or not a second service corresponding to the port number of the first service is enabled to be used in the second cloud computing system to the second cloud computing system, the confirmation request specifying the port number of the first service; and moving the first virtual machine to the second cloud computing system when receiving a reply indicating that the second service is enabled to be used from the second cloud computing system in response to the confirmation request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating an example of movement of a VM using a central processing unit (CPU) load obtaining service; and FIG. 17 is a diagram illustrating an example of movement of a VM that performs inter-VM communication.

DESCRIPTION OF EMBODIMENTS

Present embodiments will hereinafter be described with reference to the drawings. Each embodiment may be carried out in a state in which a plurality of embodiments are combined with each other within a scope where no inconsistency arises.

First Embodiment

A multi-cloud operating method according to a first embodiment will first be described with reference to FIGS. 1 to 4.

Figure 1:
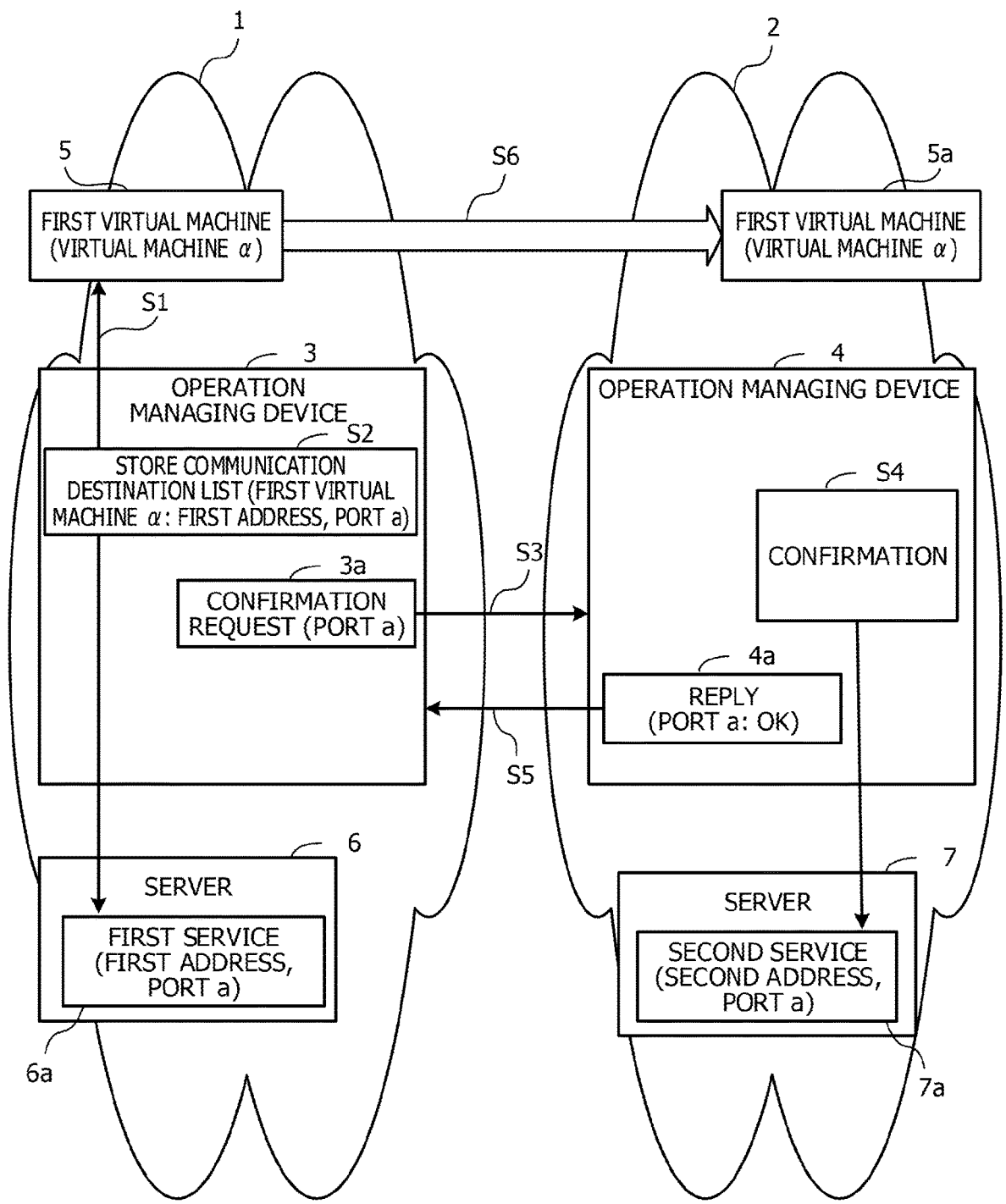
FIG. 1 is a diagram illustrating a first example of a multi-cloud operating method.

FIG. 1 is a diagram illustrating a first example of the multi-cloud operating method. FIG. 1 illustrates a processing procedure for, before moving a first virtual machine 5 by migration, confirming in advance whether processing like that before the movement may be performed even after the movement.

A multi-cloud system includes a first cloud computing system (first cloud) 1 and a second cloud computing system (second cloud) 2.

The first cloud 1 and the second cloud 2 are provided with operation managing devices 3 and 4, respectively. The operation managing device 3 may be implemented by a computer within the first cloud 1. For example, a virtual machine started on a computer within the first cloud 1 may be used as the operation managing device 3. The operation managing device 4 may be implemented by a computer within the second cloud 2. For example, a virtual machine started on a computer within the second cloud 2 may be used as the operation managing device 4.

Suppose here that the first virtual machine 5 is executed within the first cloud 1. The first virtual machine 5 is performing processing using a first service 6a provided by a server 6 within the first cloud 1 (S1). The operation managing device 3 stores, as a communication destination list, for example, the port number (port a) of the first service 6a being used by the first virtual machine 5 in association with the identifier of the first virtual machine 5 (S2). The communication destination list stores an address (first address) for accessing the first service 6a and the port number (port a) indicating a communication port at a time of usage of the service.

The operation managing device 3 thereafter receives a request by the first virtual machine 5 to move to the second cloud 2. Then, the operation managing device 3 transmits, to the second cloud 2, a confirmation request 3a to confirm whether or not a second service 7a corresponding to the port number (port a) may be used in the second cloud 2, the confirmation request 3a specifying the port number (port a) of the first service 6a (S3).

Receiving the confirmation request 3a, the operation managing device 4 within the second cloud confirms whether or not the second service 7a corresponding to the port number (port a) indicated in the confirmation request 3a may be used in the second cloud 2 (S4). For example, the operation managing device 4 attempts communication using the port number (port a) indicated in the confirmation request 3a with each device that may communicate within the second cloud 2, and confirms whether there is a corresponding service or not. In the example of FIG. 1, the second service 7a corresponding to the port number (port a) indicated in the confirmation request 3a is provided in a server 7 within the second cloud 2. Accordingly, the operation managing device 4 transmits a reply 4a indicating that the port may be used to the operation managing device 3 of the first cloud 1 (S5).

When the operation managing device 3 of the first cloud 1 receives the reply 4a to the confirmation request 3a from the second cloud 2, the reply 4a indicating that the second service 7a may be used, the operation managing device 3 moves the first virtual machine 5 to the second cloud 2 by migration processing (S6).

Thus, it is possible to confirm, before moving the first virtual machine 5, whether or not a same kind of service as the present service may be used even after the movement of the first virtual machine 5. When the same kind of service may be used even after the movement, a first virtual machine 5a after the movement may perform processing like that before the movement.

Figure 2:
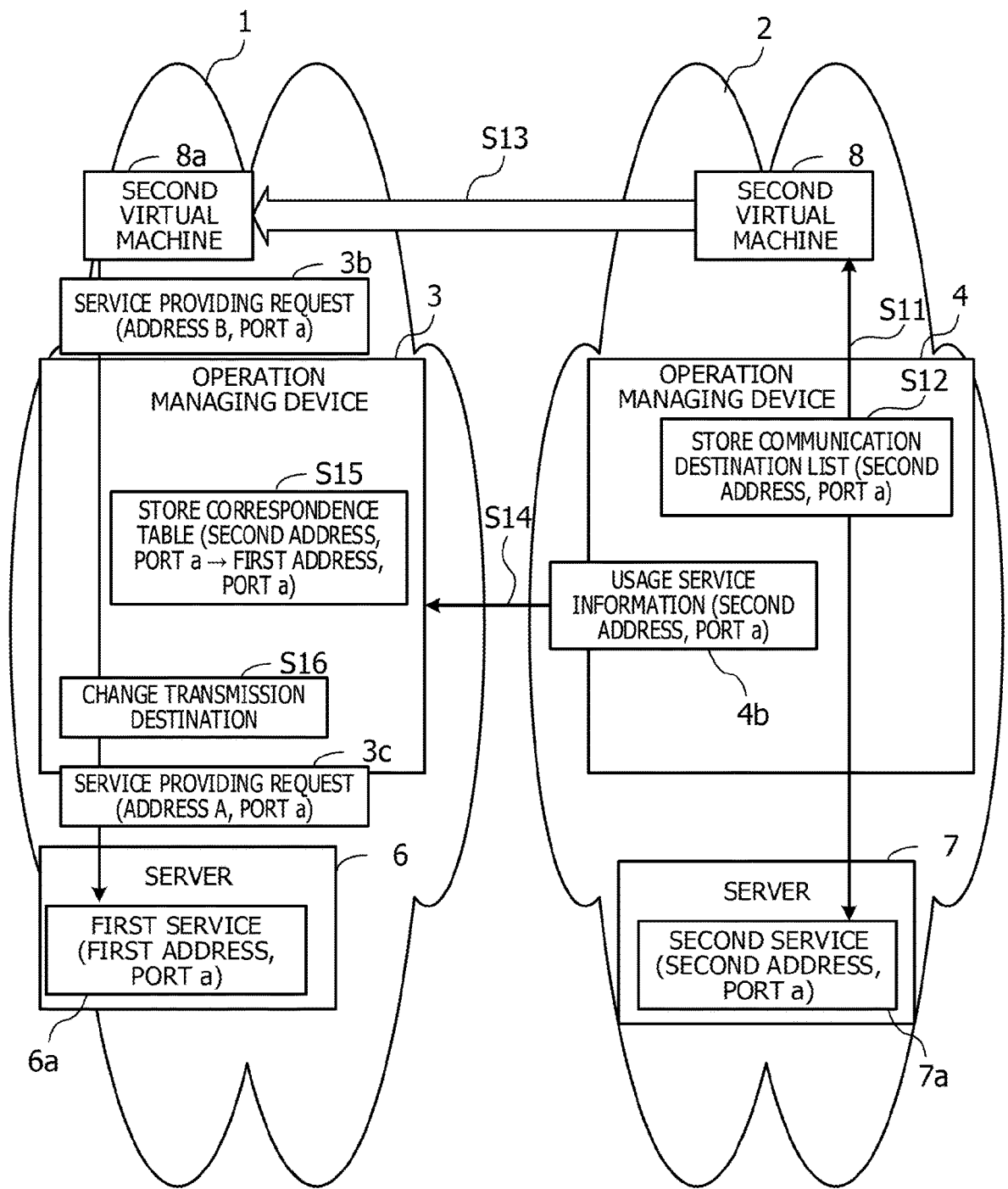
FIG. 2 is a diagram illustrating a second example of a multi-cloud operating method.

FIG. 2 is a diagram illustrating a second example of a multi-cloud operating method. FIG. 2 illustrates a processing procedure for a virtual machine after being moved to use a service. For example, a case is assumed in which a second virtual machine 8 operating in the second cloud 2 is moved to the first cloud 1.

Within the second cloud 2, the second virtual machine 8 is using the second service 7a provided by the server 7 (S11). The operation managing device 4 of the second cloud 2 stores a communication destination list indicating the address (second address) and port number (port a) of the second service 7a as a communication destination of the second virtual machine 8 in association with the identifier of the second virtual machine 8 (S12). When the operation managing device 4 thereafter receives a request by the second virtual machine 8 to move to the first cloud 1, the operation managing device 4 moves the second virtual machine 8 to the first cloud 1 (S13).

When the second virtual machine 8 executed within the second cloud 2 is moved to the first cloud 1, the operation managing device 3 of the first cloud 1 obtains the second address for access to the second service 7a used by the second virtual machine 8 from the second cloud 2 (S14). For example, the operation managing device 3 obtains usage service information 4b including the second address and the port number (port a) of the second service 7a from the operation managing device 4 of the second cloud 2.

The operation managing device 3 of the first cloud 1 stores a correspondence table indicating correspondence relation between the first address for access to the first service 6a providing the same kind of service as the second service 7a within the first cloud 1 and the obtained second address (S15).

When the operation managing device 3 thereafter receives a service providing request 3b specifying the second address from a second virtual machine 8a after the movement, the operation managing device 3 changes the transmission destination of the service providing request 3b to the first address, based on the correspondence table (S16). A service providing request 3c in which the transmission destination is changed is transmitted to the server 6. As a result, the server 6 executes the first service 6a in response to the service providing request 3c.

The operation managing device 3 thus changes the address of the transmission destination of the service providing request 3b output by the second virtual machine 8a after the movement. Consequently, when the second virtual machine 8a transmits the service providing request 3b to a transmission destination like that when the second virtual machine 8a operates within the second cloud 2, the second virtual machine 8a may use the first service 6a of the same kind as the second service 7a used before the movement. For example, processing like that before the movement may be performed without any change being made to the moved second virtual machine 8a.

Figure 3:
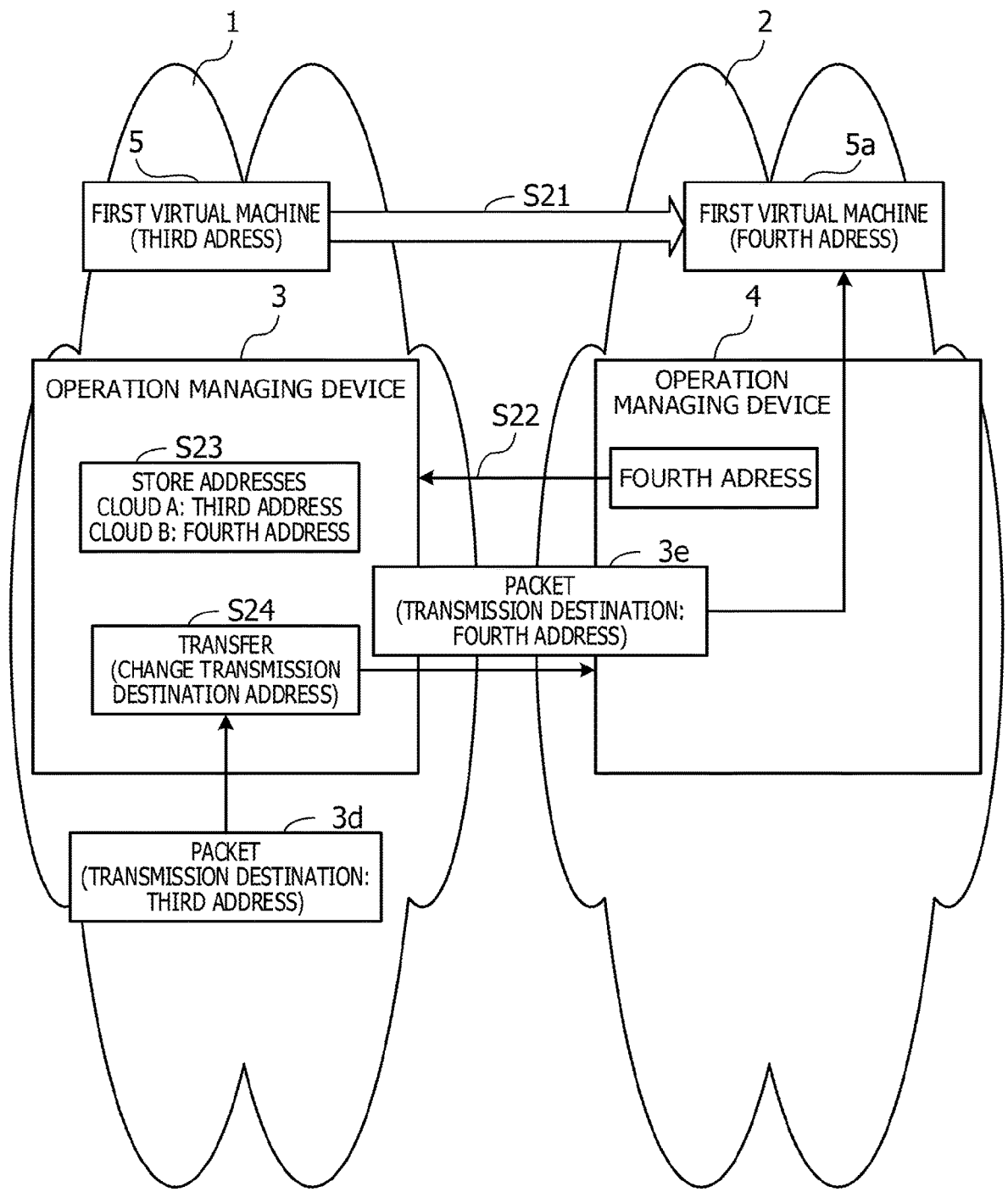
FIG. 3 is a diagram illustrating a third example of a multi-cloud operating method.

FIG. 3 is a diagram illustrating a third example of a multi-cloud operating method. FIG. 3 illustrates a processing procedure for, even after a movement straddling the clouds, enabling a packet to be received in a manner like that before the movement. For example, like in FIG. 1, a case is assumed in which the first virtual machine 5 operating in the first cloud 1 is moved to the second cloud 2.

Suppose that the address of the first virtual machine 5 in the first cloud 1 is a third address. When the first virtual machine is moved to the second cloud 2 (S21), a first virtual machine 5a after the movement is given a fourth address within the second cloud 2.

The operation managing device 3 of the first cloud 1 obtains the fourth address of the first virtual machine 5a within the second cloud 2 after the movement from the operation managing device 4 of the second cloud 2 (S22). The operation managing device 3 stores the third address of the first virtual machine 5 within the first cloud 1 and the fourth address of the first virtual machine 5a after the movement in association with each other (S23).

After the first virtual machine 5 is moved to the second cloud 2, the operation managing device 3 changes the transmission destination of a packet 3d occurring within the first cloud 1 and having the third address as a transmission destination to the fourth address, and transfers a packet 3e after the changing of the transmission destination to the second cloud 2 (S24). The operation managing device 4 of the second cloud 2 transmits the packet 3e to the first virtual machine 5a having the fourth address.

After the first virtual machine 5 is moved, the operation managing device 3 thus changes the transmission destination of the packet 3d addressed to the first virtual machine 5 to the fourth address of the first virtual machine 5a after the movement. Consequently, the first virtual machine 5a after the movement may receive the packet like that before the movement. For example, even when the first virtual machine 5 moves so as to straddle the clouds, another device communicating with the first virtual machine 5 may transmit a packet to the first virtual machine 5a after the movement without changing the setting of the transmission destination.

Figure 4:
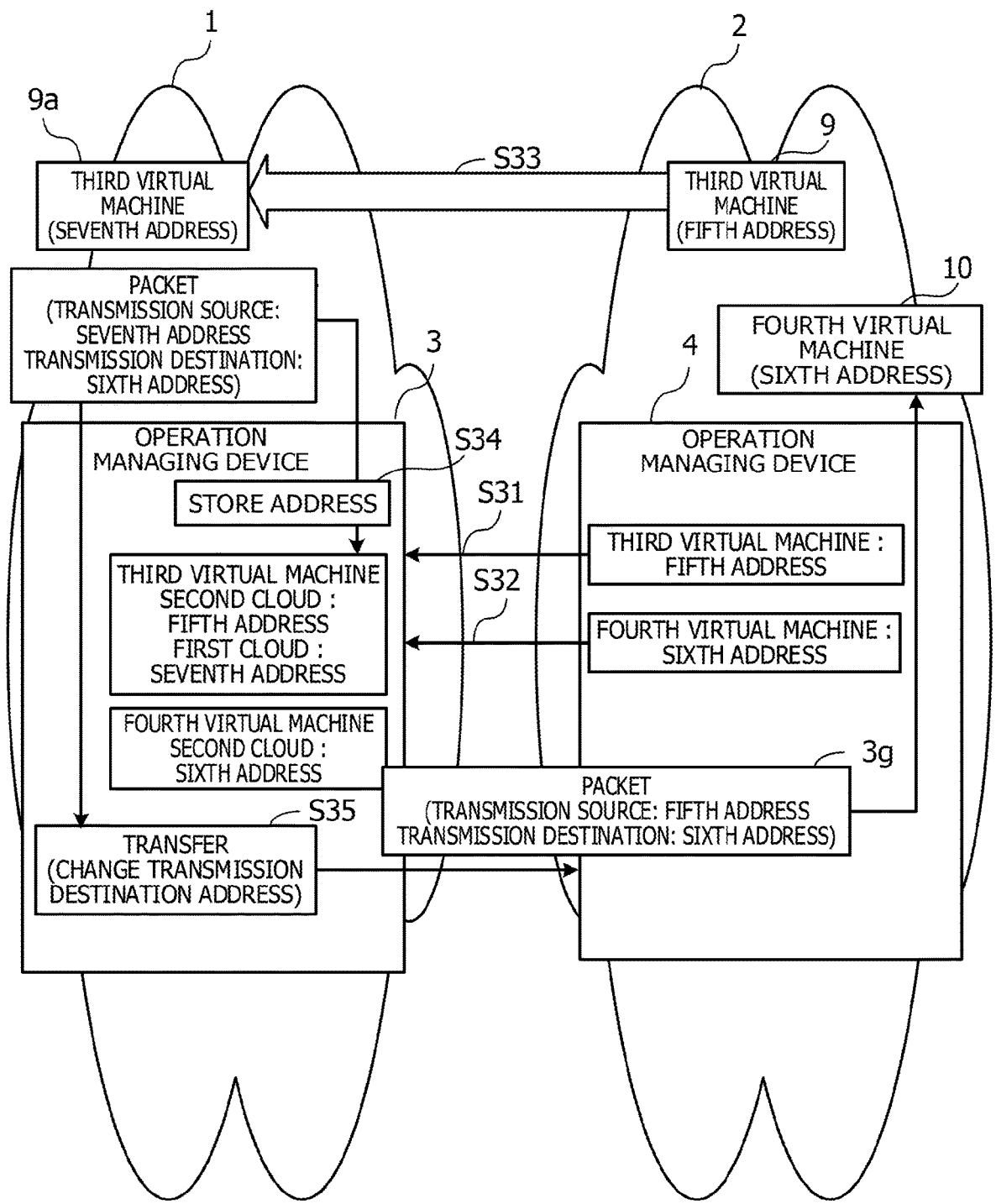
FIG. 4 is a diagram illustrating a fourth example of a multi-cloud operating method.

FIG. 4 is a diagram illustrating a fourth example of a multi-cloud operating method. FIG. 4 illustrates a processing procedure for, even after a movement straddling the clouds, enabling a packet to be transmitted like that before the movement. For example, a case is assumed in which, of a third virtual machine 9 and a fourth virtual machine 10 operating in the second cloud 2, the third virtual machine 9 is moved to the first cloud 1 and thereafter a packet is transmitted from a third virtual machine 9a after the movement to the fourth virtual machine 10.

When the third virtual machine 9 is generated within the second cloud 2, the operation managing device 3 of the first cloud 1 obtains a fifth address of the third virtual machine 9 within the second cloud 2 from the operation managing device 4 of the second cloud 2 (S31). The operation managing device 3 stores the obtained fifth address in a memory, for example. In addition, when the fourth virtual machine 10 is generated within the second cloud 2, the operation managing device 3 of the first cloud 1 obtains a sixth address of the fourth virtual machine 10 within the second cloud 2 from the second cloud 2 (S32). The operation managing device 3 stores the obtained sixth address in the memory, for example. Thus, the operation managing device 3 recognizes that the third virtual machine 9 and the fourth virtual machine 10 are present within the second cloud 2, and stores the addresses of the third virtual machine 9 and the fourth virtual machine 10.

The third virtual machine 9 is thereafter moved to the first cloud 1 (S33). Then, the operation managing device 3 of the first cloud 1 stores a seventh address, within the first cloud 1, of the third virtual machine 9a after the movement in association with the fifth address of the third virtual machine 9 before the movement (S34). The operation managing device 3 thereby recognizes that the third virtual machine 9a is moved to the first cloud 1.

Suppose here that the third virtual machine 9a after the movement outputs a packet 3f having the sixth address of the fourth virtual machine 10 as a transmission destination. In this case, the operation managing device 3 changes the address of a transmission source of the output packet 3f to the fifth address, and transfers a packet 3g after the changing of the transmission source to the second cloud 2 (S35). The operation managing device 4 of the second cloud 2 transmits the packet 3g to the fourth virtual machine 10 having the sixth address.

Thus, when the packet 3f addressed to the fourth virtual machine 10 within the second cloud 2 is output from the third virtual machine 9a after the movement, the operation managing device 3 changes the transmission source of the packet 3f to the fifth address of the third virtual machine 9 before the movement. The fourth virtual machine 10 may thereby receive the packet like that received from the third virtual machine 9 before the movement from the third virtual machine 9a after the movement. As a result, the fourth virtual machine 10 may communicate like that before the movement with the third virtual machine 9a after the movement without being aware that the third virtual machine 9 is moved.

When the fourth virtual machine 10 is not aware of the movement of the third virtual machine 9, for example, the transmission destination of a packet transmitted from the fourth virtual machine 10 to the third virtual machine 9a after the movement is the fifth address of the third virtual machine 9 before the movement. The transmission destination of the packet is changed to the seventh address by the processing illustrated in FIG. 3, and the packet is transferred to the third virtual machine 9a after the movement. In this case, when the transmission source of a packet as a response to the transferred packet remains the seventh address, the fourth virtual machine 10 recognizes that the returned packet is a packet from another device than the transmission destination of the transmitted packet (third virtual machine 9). Accordingly, as illustrated in FIG. 4, the operation managing device 3 changes the transmission source of the packet transmitted to the fourth virtual machine 10 by the third virtual machine 9a to the fifth address. The fourth virtual machine 10 may thereby correctly recognize that the packet transmitted from the third virtual machine 9a after the movement is a response to the packet transmitted to the third virtual machine 9 before the movement by the fourth virtual machine 10.

The operation managing device 4 also has functions like the functions of the operation managing device 3 illustrated in FIGS. 1 to 4. In addition, the operation managing device 3 also has functions like the functions of the operation managing device 4 illustrated in FIGS. 1 to 4. As a result, in the multi-cloud system, even when a virtual machine is moved to a different cloud, a virtual machine as a communication partner with the moved virtual machine may perform communication like that before the movement without correcting positional information of the moved virtual machine. In addition, the moved virtual machine may also obtain management information as if operating in the original cloud. As a result, a flexible system utilizing respective advantages of a plurality of clouds may be constructed easily.

As processing other than that of FIGS. 1 to 4, the operation managing devices 3 and 4 may divide one service providing request into a plurality of service providing requests to a plurality of respective clouds. For example, suppose that the first virtual machine 5 executed in the first cloud 1 outputs a multiplex service providing request specifying the first service 6a and the second service 7a, In this case, the operation managing device 3 divides the output multiplex service providing request into a first request having the address of the first service 6a as a transmission destination and a second request having the address of the second service 7a as a transmission destination. Then, the operation managing device 3 transmits the first request to the first service 6a within the first cloud 1, and transmits the second request to the second cloud 2. The operation managing device 4 within the second cloud 2 transfers the second request to the second service 7a, Thus dividing one multiplex service providing request into requests to a plurality of services within different clouds facilitates a multiplex service providing request to services of a same kind, for example.

In the case where the multiplex service providing request is divided, the operation managing device 3 may integrate responses to the plurality of respective requests after the division into one response to the multiplex service providing request. For example, the operation managing device 3 waits for responses until the operation managing device 3 receives a first response corresponding to the first request and a second response corresponding to the second request. When the operation managing device 3 then receives the first response and the second response, the operation managing device 3 integrates the first response and the second response into one response, and returns the response to the first virtual machine 5 as the transmission source of the multiplex service providing request. The first virtual machine 5 may thereby easily make a processing request to services straddling the plurality of clouds.

The operation managing devices 3 and 4 may, for example, perform the multi-cloud operating method illustrated in FIGS. 1 to 4 by executing a program describing the processing procedures illustrated in FIGS. 1 to 4. The operation managing devices 3 and 4 have a storage unit and a processing unit to perform the multi-cloud operating method. The storage unit is, for example, a memory included in a computer within a cloud or a storage device. The processing unit is, for example, a processor included in a computer within a cloud or an arithmetic circuit.

Second Embodiment

A second embodiment will next be described. The second embodiment is a multi-cloud system that has a function of inhibiting processing performed thus far in a VM from being unable to be performed after a VM movement, in addition to confirming that the processing may be continued even after the VM movement.

For example, in a case where a VM is moved so as to straddle clouds, the multi-cloud system according to the second embodiment confirms before the movement of the VM whether there are resources available for executing the VM in a cloud as a movement destination. However, even when there are sufficient available resources in the cloud as the movement destination, an environment setting such as an internet protocol (IP) address is changed as the VM is moved, and thus it may be difficult to continue processing performed within the multi-cloud system unless some measure is taken. The processing that becomes difficult to continue includes, for example, inter-VM communication or access to metric information (charging information according to usage of the VM, load information of the VM, or the like).

Causes of difficulty in inter-VM communication as the VM is moved include changing of an IP address. For example, in the multi-cloud system, a plurality of VMs are disposed dynamically and flexibly. Therefore, a part of the plurality of VMs disposed within a same cloud may be moved to another cloud. When a VM is moved so as to straddle the clouds, the IP address of the moved VM is changed so that the VM may be operated in the cloud as the movement destination. With the change in the IP address of the moved VM, it is difficult, in the past, for another VM communicating with the moved VM to communicate with the moved VM unless the IP address of the transmission destination of a packet addressed to the moved VM is changed. Furthermore, the IP address assigned to the VM within the cloud is often a local IP address for communication within the cloud and is not a global IP address usable for communication straddling the plurality of clouds. When the local IP address is assigned to the moved VM, it is difficult for the other VM communicating with the moved VM to communicate with the moved VM by simply changing the IP address of the destination.

The VM movement may also make it difficult to access metric information. The metric information is information obtained as a result of monitoring a computer, the information being a CPU load or the like. For example, a method of obtaining the metric information managed by a cloud for a VM may differ between a cloud as a movement source and a cloud as a movement destination. In this case, when the VM moves so as to straddle the clouds, it is difficult to access the metric information by the same procedure as before the movement even if the metric information of the VM is desired to be obtained. Furthermore, an IP address for access to the metric information of each cloud often allows limited access thereto from the outside of the cloud. For example, there is a limitation on access to charging information for a user of a VM started within a cloud from the outside of the cloud. As a result, when the VM moves so as to straddle clouds, it is difficult to obtain the metric information related to the VM.

In the multi-cloud system according to the second embodiment, an identifier common between a plurality of clouds is given to a VM, and communication is enabled via the identifier even when the VM moves so as to straddle clouds. Hereinafter, the identifier common between the plurality of clouds will be referred to as a mediator (ID).

Figure 5:
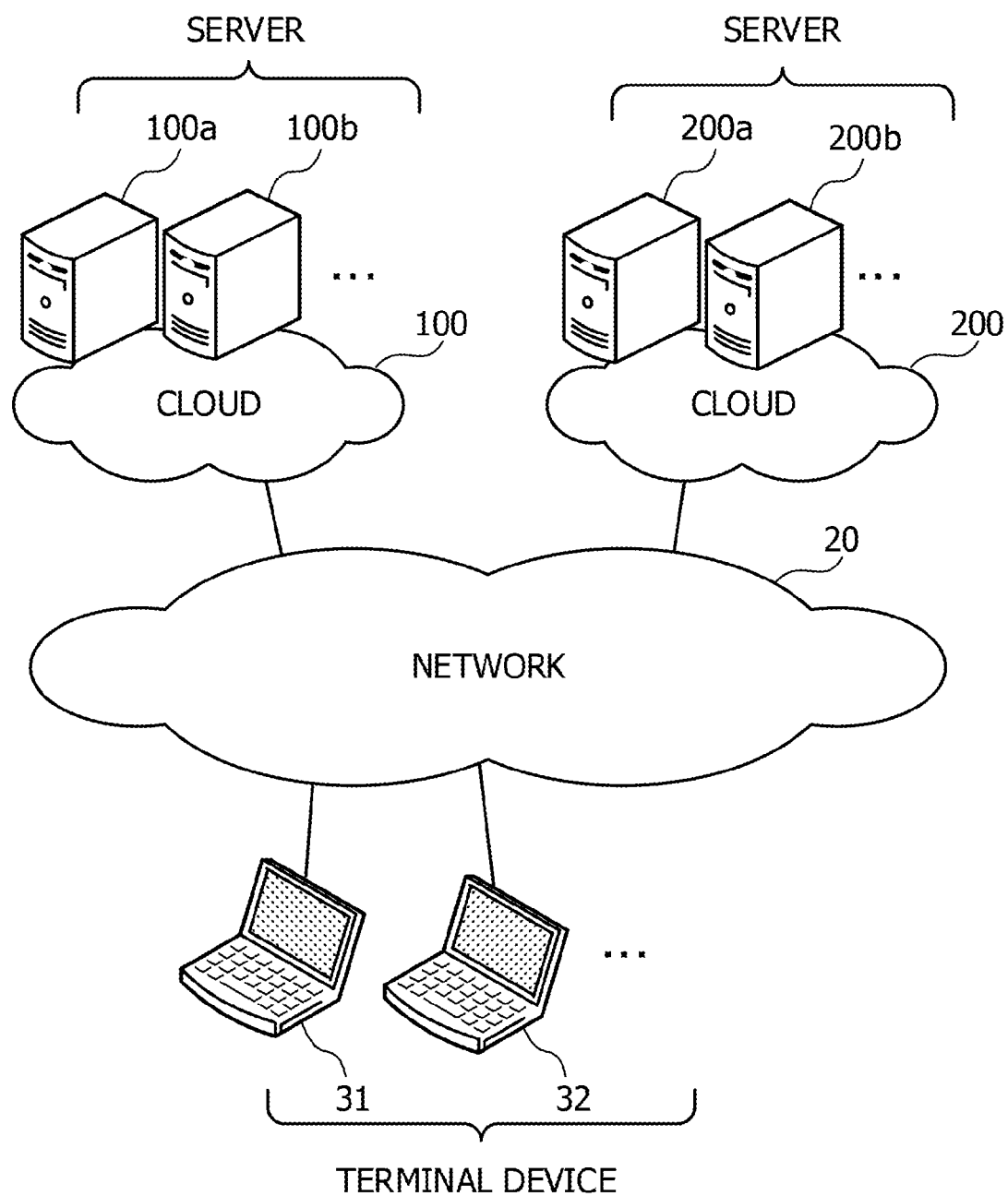
FIG. 5 is a diagram illustrating an example of a multi-cloud system according to a second embodiment.

FIG. 5 is a diagram illustrating an example of the multi-cloud system according to the second embodiment. Terminal devices 31, 32, . . . used by users are connected to a plurality of clouds 100 and 200 via a network 20. The cloud 100 is implemented by a plurality of servers 100a, 100b, . . . . The cloud 200 is implemented by a plurality of servers 200a, 200b, . . . .

The users of the terminal devices 31, 32, . . . may be provided with a VM usage environment from each of the two clouds 100 and 200. Then, the users implement intended processing by making VMs provided from the different clouds perform cooperative operation.

Figure 6:
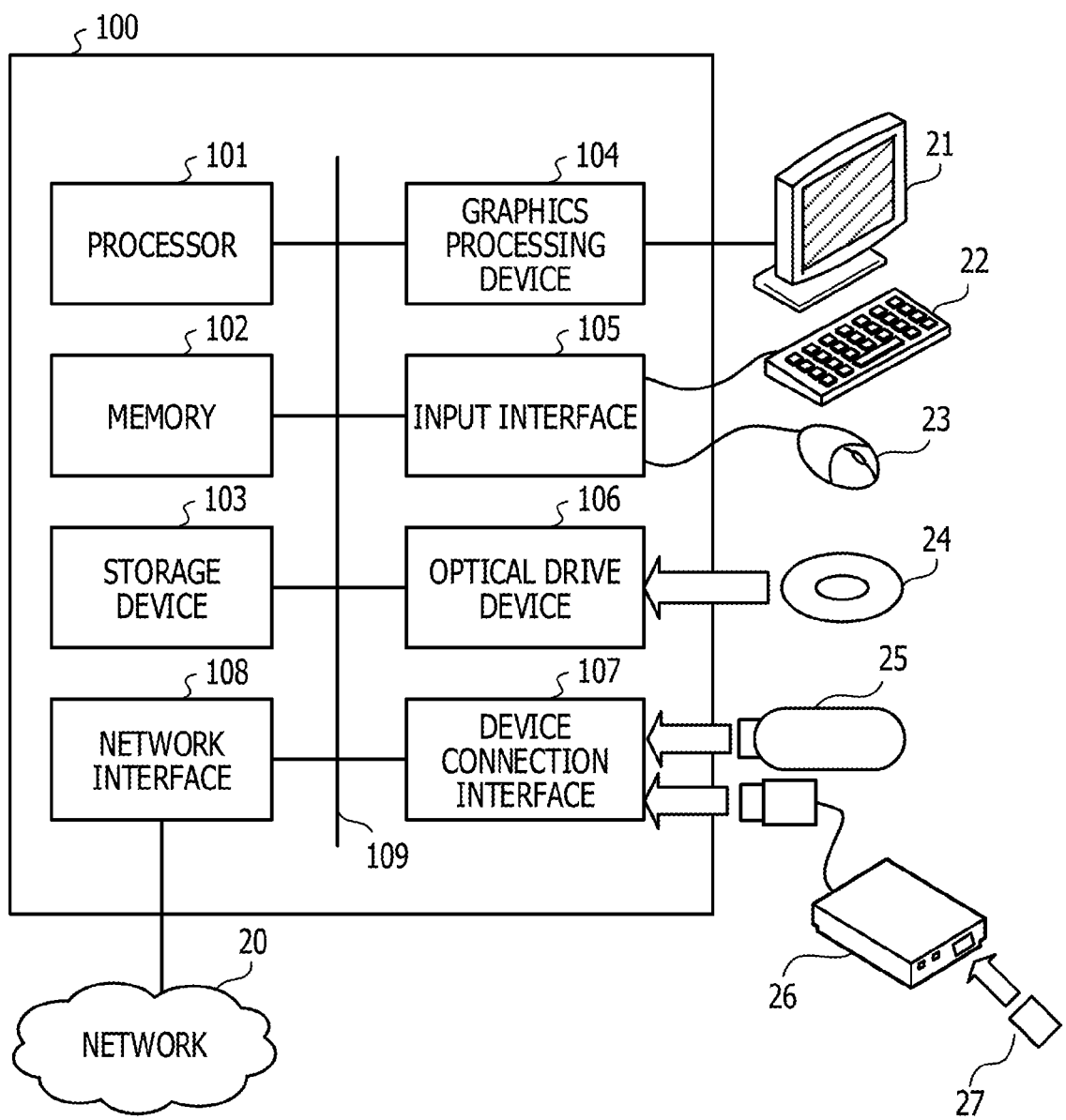
FIG. 6 is a diagram illustrating an example of a configuration of hardware of a server.

FIG. 6 is a diagram illustrating an example of a configuration of hardware of a server. The whole apparatus of a server 100a is controlled by a processor 101. The processor 101 is connected with a memory 102 and a plurality of peripheral devices via a bus 109. The processor 101 may be a multiprocessor. The processor 101 is, for example, a CPU, a micro processing unit (MPU), or a digital signal processor (DSP). At least a part of functions that the processor 101 implements by executing a program may be implemented by an electronic circuit such as an application specific integrated circuit (ASIC) or a programmable logic device (PLD).

The memory 102 is used as a main storage device of the server 100a, The memory 102 temporarily stores at least a part of an operating system (OS) program and an application program executed by the processor 101. In addition, the memory 102 stores various kinds of data used for processing by the processor 101. A volatile semiconductor storage device such as a random access memory (RAM) is used as the memory 102.

Peripheral devices connected to the bus 109 include a storage device 103, a graphics processing device 104, an input interface 105, an optical drive device 106, a device connection interface 107, and a network interface 108.

The storage device 103 electrically or magnetically writes and reads data to and from an internal recording medium. The storage device 103 is used as an auxiliary storage device of the computer. The storage device 103 stores the OS program, application programs, and various kinds of data. A hard disk drive (HDD) or a solid state drive (SSD), for example, may be used as the storage device 103.

The graphics processing device 104 is connected with a monitor 21. The graphics processing device 104 displays an image on a screen of the monitor 21 according to an instruction from the processor 101. As the monitor 21, there is a display device using organic electro luminescence (EL), a liquid crystal display device, or the like.

The input interface 105 is connected with a keyboard 22 and a mouse 23. The input interface 105 transmits signals sent from the keyboard 22 and the mouse 23 to the processor 101. The mouse 23 is an example of a pointing device, and other pointing devices may also be used. The other pointing devices include a touch panel, a tablet, a touch pad, a trackball, and the like.

The optical drive device 106 reads data recorded on an optical disk 24 by using laser light or the like. The optical disk 24 is a portable recording medium on which data is recorded so as to be readable by the reflection of light. As the optical disk 24, there are a digital versatile disc (DVD), a DVD-RAM, a compact disc read only memory (CD-ROM), a recordable (CD-R)/rewritable (RW), and the like.

The device connection interface 107 is a communication interface for connecting peripheral devices to the server 100a, For example, the device connection interface 107 may be connected with a memory device 25 and a memory reader-writer 26. The memory device 25 is a recording medium having a function of communicating with the device connection interface 107. The memory reader-writer 26 is a device that writes data to a memory card 27 or reads data from the memory card 27. The memory card 27 is a card type recording medium.

The network interface 108 is connected to the network 20. The network interface 108 transmits and receives data to and from another computer or a communicating device via the network 20.

The server 100a may implement processing functions of the second embodiment by the hardware configuration as described above. The other servers 100b, ..., 200a, 200b, ... may also be implemented by hardware like that of the server 100a, In addition, the operation managing devices 3 and 4 illustrated in the first embodiment may also be implemented by hardware like that of the server 100a illustrated in FIG. 6.

The server 100a implements the processing functions of the second embodiment by executing a program recorded on a computer readable recording medium, for example. A program describing processing contents to be executed by the server 100a may be recorded on various recording media. For example, the program to be executed by the server 100a may be stored in the storage device 103. The processor 101 loads at least a part of the program within the storage device 103 into the memory 102, and executes the program. In addition, the program to be executed by the server 100a may also be recorded on a portable recording medium such as the optical disk 24, the memory device 25, and the memory card 27. The program stored on the portable recording medium becomes executable after being installed on the storage device 103 under control of the processor 101, for example. The processor 101 may also directly read and execute the program from the portable recording medium.

In one cloud 100, the plurality of servers 100a, 100b, ... operate cooperatively, and function as one computer system. For example, in the cloud 100, operation managing functions are implemented by the plurality of servers 100a, 100b, . . . . Movement of a VM between the clouds 100 and 200 is implemented by migration of the VM. The operation managing functions determine whether the VM may continue processing at a movement destination, and perform relay processing for communication of the moved VM so that communication like that before the movement may be performed even after the movement.

Figure 7:
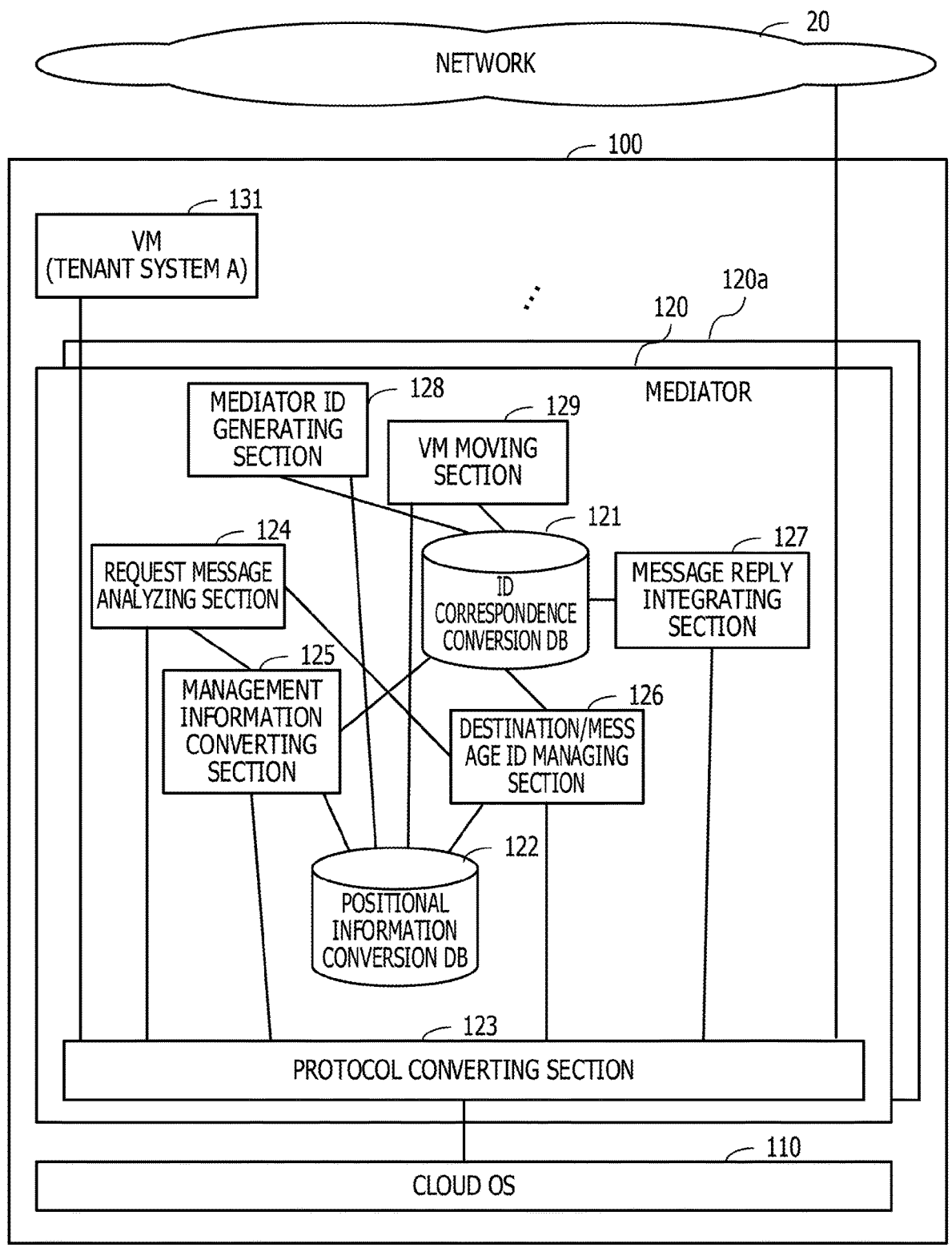
FIG. 7 is a block diagram illustrating an example of operation managing functions in a cloud.

FIG. 7 is a block diagram illustrating an example of the operation managing functions in a cloud. The cloud 100 has mediators 120, 120a, ... as the operation managing functions. The mediators 120, 120a, ... are executed on a cloud OS 110. The mediators 120, 120a, ... are, for example, provided for respective tenants using the cloud 100. For example, a tenant using the mediator 120 starts a VM 131 within the cloud 100, and implements a "tenant system A" by using the VM 131.

The cloud OS 110 manages the VM 131 and the mediators 120, 120a, ... within the cloud 100. For example, the cloud OS 110 generates the VM 131 according to a request to generate the VM 131. When an instruction to move the VM 131 is input from a user using the VM 131, the cloud OS 110 transmits a request to move the VM 131 to the mediator 120.

The mediator 120 moves the VM 131 to another cloud 200 in response to the request to move the VM 131. The mediator 120 relays communication of the VM 131 with another VM. The mediator 120 thereby enables communication between the VMs even when the VM 131 or the other VM moves to the other cloud 200. When the VM 131 is moved to the cloud 200, the mediator 120 cooperates with a mediator provided within the cloud 200 as a movement destination, and determines whether or not processing performed by the VM 131 may be likewise performed also in the cloud 200 as the movement destination.

For operation management of the VM, the mediator 120 includes an ID correspondence conversion DB 121, a positional information conversion DB 122, a protocol converting section 123, a request message analyzing section 124, a management information converting section 125, a destination/message ID managing section 126, a message reply integrating section 127, a mediator ID generating section 128, and a VM moving section 129.

The ID correspondence conversion DB 121 stores correspondence relation between the identifier (instance ID) of the VM or a metric ID identifying a metric information providing service within the cloud and a mediator ID uniquely identifying the VM within the multi-cloud system.

The positional information conversion DB 122 stores positional information of the VM, the positional information indicating in which cloud the VM is currently disposed or in which cloud the VM was disposed in the past, for example.

The protocol converting section 123 converts a communication protocol so that communication may be performed properly when data is transmitted and received to and from the outside or when data is hooked. For example, the protocol converting section 123 may mutually convert data formats between various protocols such as hypertext transfer protocol (HTTP), remote procedure call (RPC), and advanced message queuing protocol (AMQP).

The request message analyzing section 124 performs format conversion into a request message corresponding to a transmission destination according to a request to obtain charging information or a monitoring observation value of the CPU or the memory from the VM. The format conversion converts an instruction name, an argument, or the like.

The management information converting section 125 manages originally expressed management information (instance IDs, metric names, and the like) of each cloud, and mutually converts expression formats.

The destination/message ID managing section 126 retrieves a message inquiry destination or the like from the instance IDs or the like, and makes a request to transmit a converted message.

The message reply integrating section 127 performs processing of integrating reply messages in response to a requesting message. For example, the message reply integrating section 127 integrates replies sent from a plurality of mediators into one reply message. The message reply integrating section 127 also performs synchronous/asynchronous processing and reply message format conversion processing.

The mediator ID generating section 128 generates the mediator ID of a VM or a metric information providing service. For example, each time a VM to be used by the tenant corresponding to the mediator 120 is generated, the mediator ID generating section 128 generates the mediator ID of the VM. The mediator ID generating section 128 registers the generated mediator ID in the ID correspondence conversion DB 121. The mediator ID generating section 128 registers a record for setting information related to the generated mediator ID in the positional information conversion DB 122.

The VM moving section 129 determines whether or not the VM 131 to be moved may continue present processing in a cloud as a movement destination before moving the VM 131 when the VM 131 is to be moved so as to straddle the clouds. For example, when the VM moving section 129 obtains a request to move the VM 131 from the cloud OS 110, the VM moving section 129 cooperates with a mediator in the cloud as the movement destination to determine whether or not the processing currently performed by the VM 131 may be continued in the cloud as the movement destination. Then, when the VM moving section 129 may confirm that the processing may be continued in the cloud as the movement destination, the VM moving section 129 performs movement (migration) of the VM 131.

Lines connecting the elements illustrated in FIG. 7 to one another represent a part of communication paths, and communication paths other than the communication paths illustrated in the figure may also be set. Functions of the respective elements illustrated in FIG. 7 may be implemented by making a computer perform program modules corresponding to the elements, for example. While the operation managing functions in the cloud 100 are illustrated in FIG. 7, the other cloud 200 also has functions like those of the cloud 100.

Description will next be made of a method of generating a mediator ID that uniquely identifies a VM or a metric information providing service within the multi-cloud system.

Figure 8:
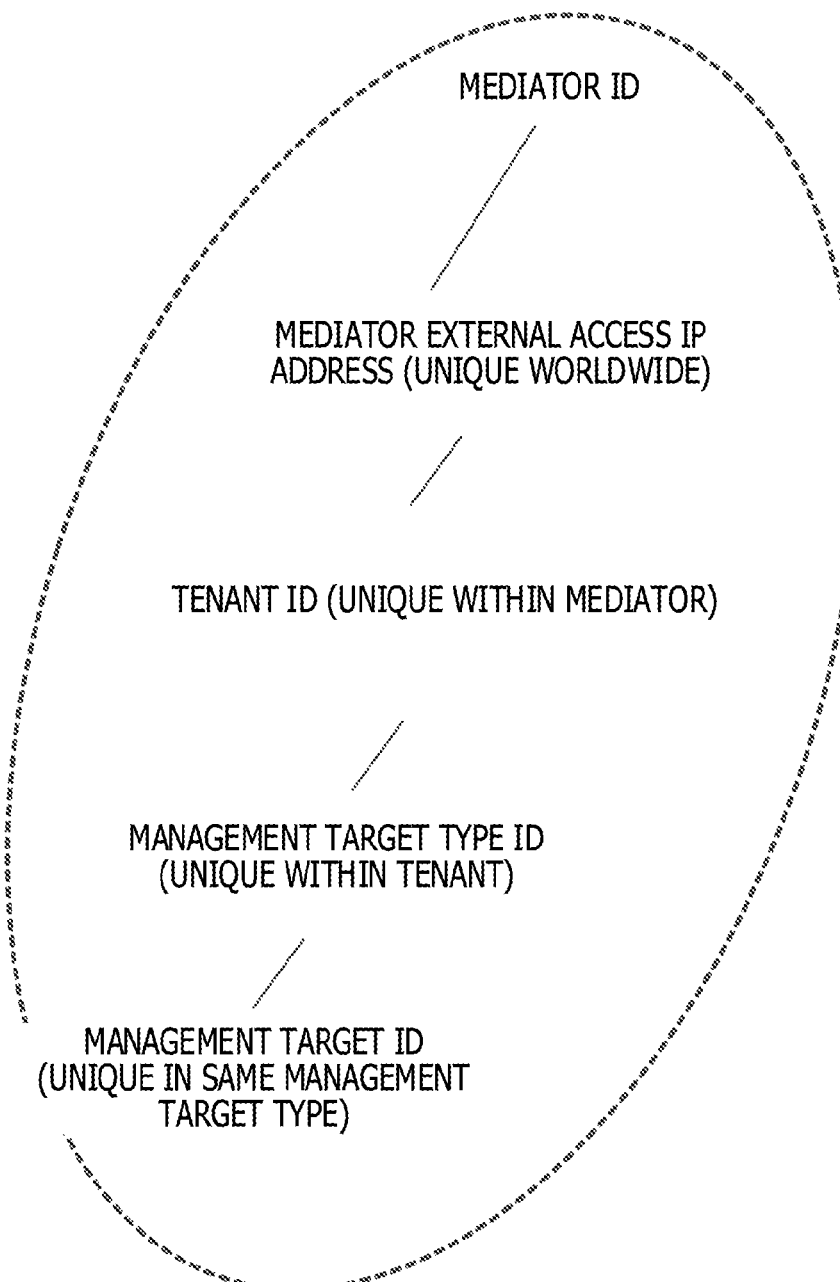
FIG. 8 is a diagram illustrating an example of generation of a mediator identification (ID)

FIG. 8 is a diagram illustrating an example of generation of a mediator ID. The mediator ID is set as an ID unique in the whole world. A mediator ID unique in the whole world may be generated by, for example, combining an IP address of a mediator for external access (mediator IP address), a tenant ID, a management target type ID, and a management target ID with each other.

The mediator IP address is the IP address of the mediator managing a VM or a metric information providing service. The mediator IP address is an address that ensures uniqueness of the mediator on a worldwide scale.

The tenant ID is the identifier of a tenant to which the mediator managing the VM or the metric information providing service as the management target of the mediator ID belongs. The tenant ID is an identifier that ensures uniqueness of the tenant corresponding to the mediator within the multi-cloud system. The tenant ID is useful in a case where a plurality of tenants are handled by one mediator.

The management target type ID is an identifier that indicates the type of the management target (the VM or the metric information providing service). For example, when the management target is the VM, "instance" is set as the management target type ID. In addition, when the management target is the metric information providing service, the name (the name "monitor" of VM monitoring software or the like) of the metric information providing service is set as the management target type ID.

The management target ID is an identifier (CPU load or the like) that ensures uniqueness between management targets of a same management target type.

The mediator ID is, for example, a hash value obtained by performing operation by a hash function on a value obtained by combining the mediator IP address, the tenant ID, the management target type ID, and the management target ID with each other. Message digest algorithm 5 (MD5), secure hash algorithm (SHA)-1, SHA-2, or the like may be used as the hash function.

A case is assumed in which the mediator ID of a metric "CPU load (CPUload)" is calculated, for example. Here, suppose that the mediator IP address is "221.12.121.129," that the tenant ID is "fujiLab," that the management target type ID is "Ceilometer," and that the management target ID is "CPUload." In this case, with "221.12.121.129+fujiLab+Ceilometer+CPUload" as input, calculation is performed as follows. Mediator ID (SHA-1[221.12.121.129+fujiLab+Ceilometer+CPUload])
=b91f57ab5d2fd0683c08714d18216995.

By generating a mediator ID for each VM or each metric information providing service of the VM as a management target, it is possible to set an identifier ensuring uniqueness over the whole of the wide-area network 20 to the management target. The mediator ID for each management target and information used in generating the mediator ID are managed by the ID correspondence conversion DB 121.

Figure 9:
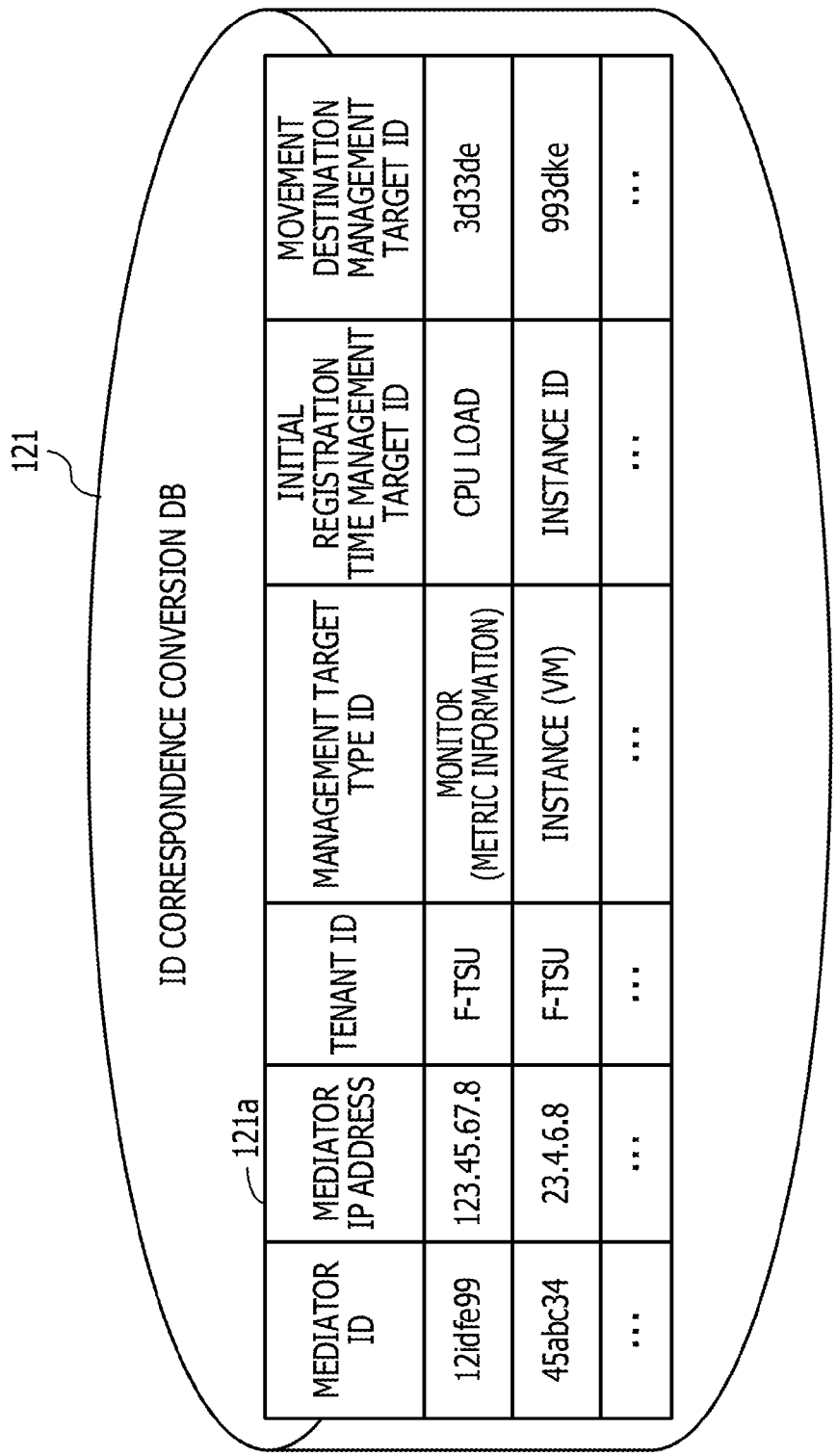
FIG. 9 is a diagram illustrating an example of an ID correspondence conversion data base (DB)

FIG. 9 is a diagram illustrating an example of the ID correspondence conversion DB. The ID correspondence conversion DB 121 stores an ID correspondence conversion table 121a, for example. Registered in the ID correspondence conversion table 121a are a mediator IP address, a tenant ID, a management target type ID, an initial registration time management target ID, and a movement destination management target ID in association with the mediator ID of a VM or a metric information providing service. The mediator ID, the mediator IP address, the tenant ID, and the management target type ID are as described with reference to FIG. 8. The initial registration time management target ID is the management target ID of a management target when the VM or the metric information providing service of the VM is first registered as the management target. The initial registration time management target ID is used in generating the mediator ID. The movement destination management target ID is the management target ID of the management target at a movement destination in a case where the VM as the management target or the like is moved so as to straddle the clouds.

The positional information conversion DB 122 manages information related to an access environment in the cloud to which the VM or the metric information providing service of the VM as the management target belongs.

Figure 10:
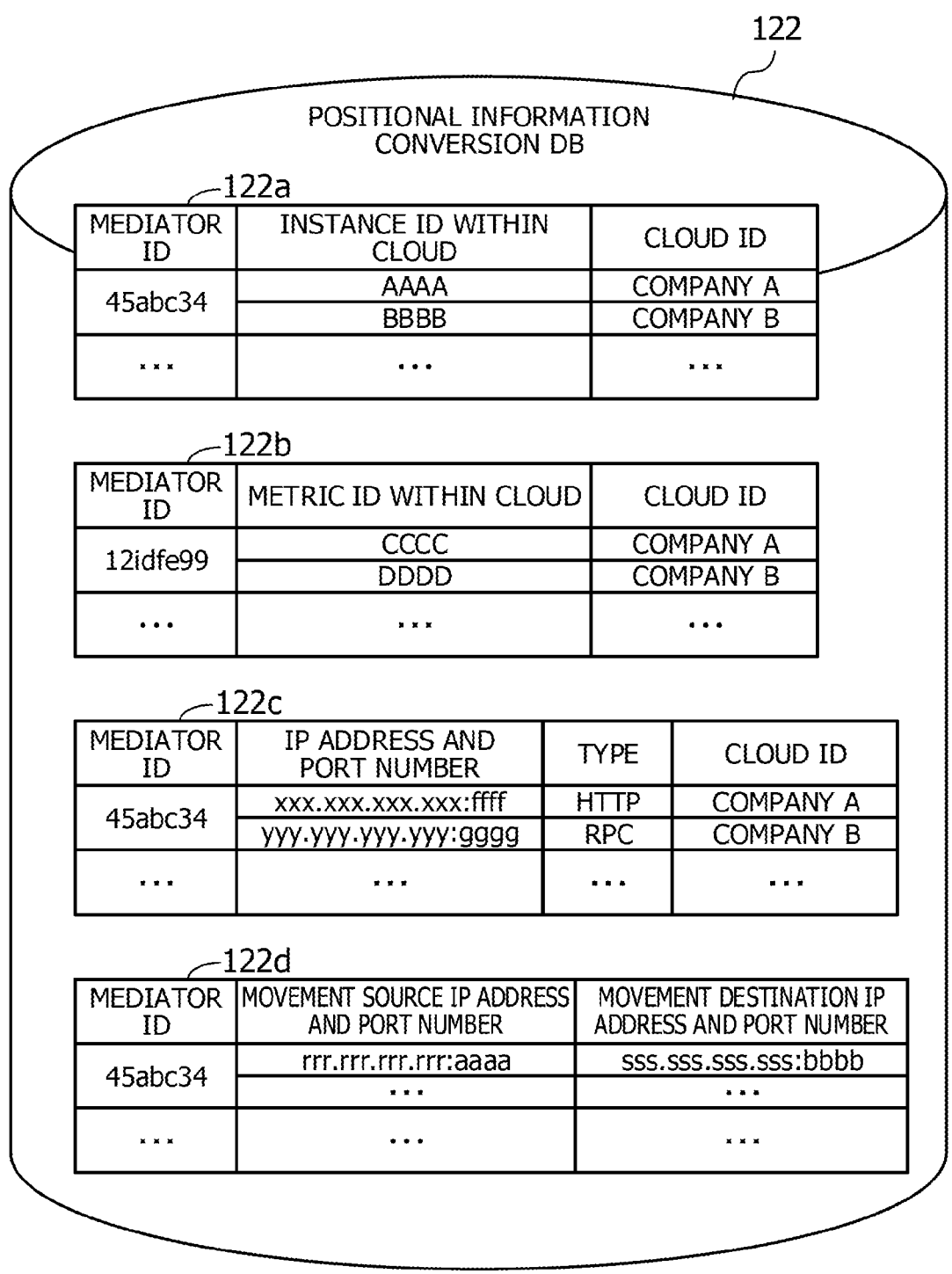
FIG. 10 is a diagram illustrating an example of a positional information conversion DB.

FIG. 10 is a diagram illustrating an example of the positional information conversion DB. The positional information conversion DB 122 stores an instance management table 122*a*, a metric management table 122*b*, a communication environment management table 122*c*, and a usage service ID correspondence table 122*d*.

Set in the instance management table 122*a* in association with the mediator ID of the VM for each cloud in which the VM has been disposed are the instance ID of the VM in the cloud and the cloud ID of the cloud in which the VM has been disposed. A set of an instance ID and a cloud ID is added as a lower record in the instance management table 122*a* each time the VM is moved so as to straddle clouds.

Set in the metric management table 122*b* in association with the mediator ID of the metric information providing service for each cloud in which the metric information providing service has been managed are the metric ID of the metric information providing service in the cloud and the cloud ID of the cloud in which the metric information providing service has been managed. A set of a metric ID and a cloud ID is added as a lower record in the metric management table 122*b* each time the cloud in which metric information providing service is managed is changed.

Set in the communication environment management table 122*c* in association with the mediator ID of the management target (the VM or the metric information providing service) are the IP address and port number of the management target, a communication type, the cloud ID of the cloud to which the management target belongs. When the management target is the VM, the IP address and the port number are the IP address and communication port number of the VM. When the management target is the metric information providing service, the IP address and the port number are an IP address and a communication port number for accessing the metric information providing service. The type is a communication protocol used in accessing the management target. A set of an IP address and a port number, a type, and a cloud ID is added as a lower record in the communication environment management table 122*c* each time the cloud in which the management target is managed is changed.

Set in the usage service ID correspondence table 122*d* in association with the mediator ID of the VM are a movement source IP address and port number and a movement destination IP address and port number. The movement source IP address and port number is the IP address and port number of a service used by the VM before movement. The movement destination IP address and port number is the IP address and port number of a same kind of service in a cloud after the movement.

The information stored in the ID correspondence conversion DB 121 and the positional information conversion DB 122 is synchronized with the other mediators, and all of mediators within the plurality of clouds 100 and 200 share the same information.

Because each of the clouds 100 and 200 has the operation managing functions illustrated in FIG. 7, information communication within the multi-cloud system may be performed based on the mediator ID without any problem even when the VM is moved so as to straddle the clouds 100 and 200. As the metric information of the VM, there is, for example, charging information according to an amount of usage of the VM for the user using the VM. When the user of the multi-cloud system desires to know a total amount charged for the VM used by the user himself/herself, the user collects charging information of the VM from the metric information providing service providing the charging information in each cloud by using an arbitrary VM.

Figure 11:
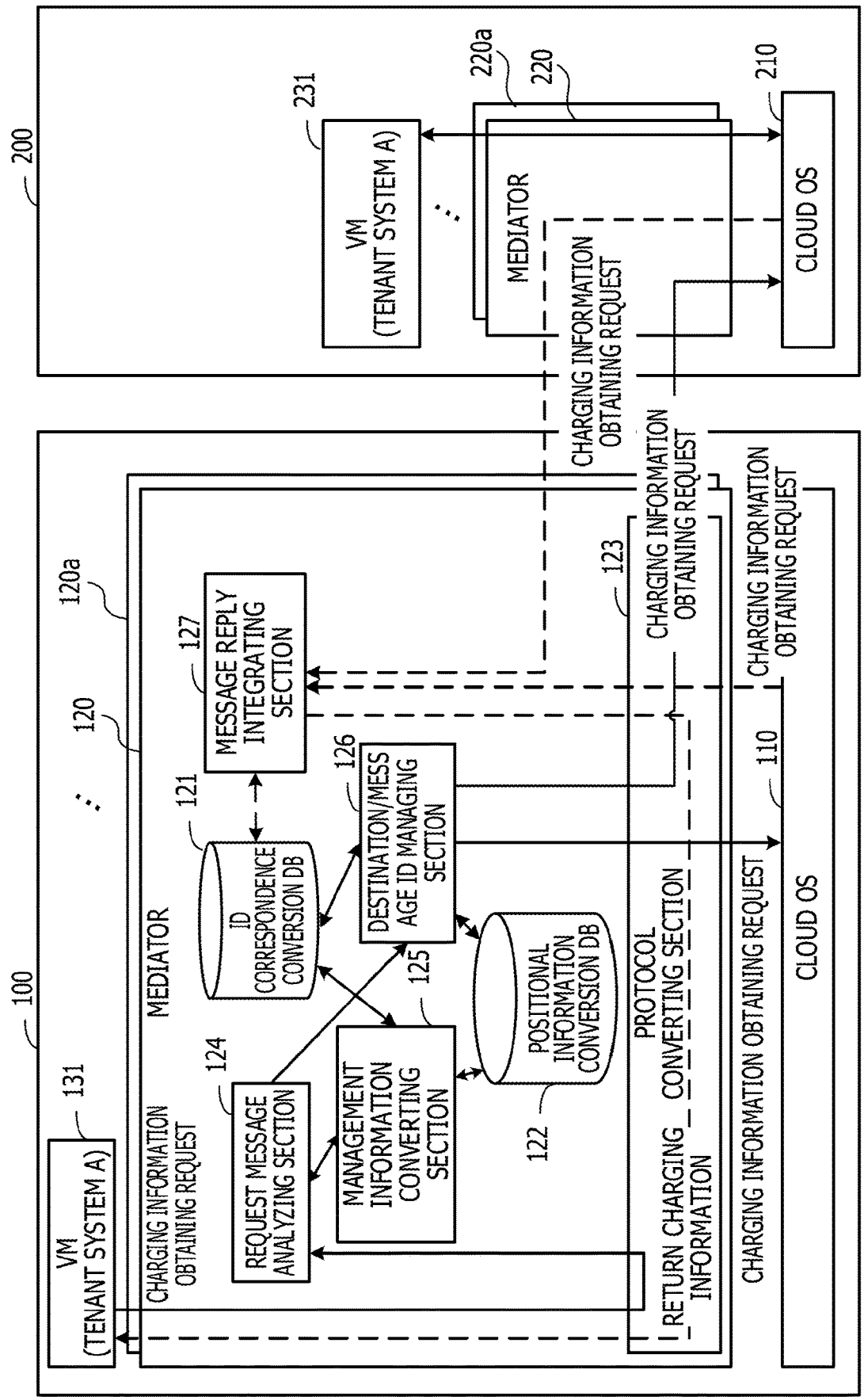
FIG. 11 is a diagram illustrating an example of collecting charging information.

FIG. 11 is a diagram illustrating an example of collection of charging information. For example, the user of the multi-cloud system instructs the VM 131 to collect charging information. Then, the VM 131 issues a charging information obtaining request for each VM constituting the multi-cloud system by HTTP, for example.

The charging information obtaining request issued by the VM 131 is transmitted to the mediator 120. In the mediator 120, the protocol converting section 123 receives the charging information obtaining request by HTTP. The protocol converting section 123 transmits the received charging information obtaining request to the request message analyzing section 124.

The request message analyzing section 124 analyzes the charging information obtaining request, and recognizes that the charging information obtaining request is received. Then, the request message analyzing section 124 enters a charging information obtainment processing routine for each VM among a plurality of pieces of message conversion processing. As charging information obtainment processing, the request message analyzing section 124 first transmits, to the management information converting section 125, a request to obtain the instance ID of a management target registered as the same tenant system as the VM 131 and information (cloud ID) of the location of the instance ID.

The management information converting section 125, for example, refers to the ID correspondence conversion DB 121, and obtains the mediator ID of a VM (management target type ID "instance") having a same tenant ID as that of the tenant to which the VM 131 belongs. Next, the management information converting section 125 refers to the instance management table 122*a* of the positional information conversion DB 122, and obtains the present position (cloud ID) of the corresponding VM by the obtained mediator ID. The management information converting section 125 transmits a set of the obtained instance ID and the cloud ID corresponding to the instance ID to the request message analyzing section 124.

When the request message analyzing section 124 obtains the set of the instance ID and the cloud ID of each VM, the request message analyzing section 124 specifies the obtained information and requests the destination/message ID managing section 126 to transmit a message of a charging information obtaining request to each cloud.

The destination/message ID managing section 126 converts the message of the charging information obtaining request into a protocol or a message format suited to each cloud. In a case of a plurality of messages, the destination/message ID managing section 126 adds an ID to each of the messages. The destination/message ID managing section 126 then requests the protocol converting section 123 to transmit the message of the charging information obtaining request.

The protocol converting section 123 transmits the message of the charging information obtaining request to each of the clouds 100 and 200 by the specified protocol. For example, the protocol converting section 123 transmits the message of the charging information obtaining request to the cloud OS 110 of the cloud 100 to which the protocol converting section 123 itself belongs. In addition, the protocol converting section 123 transmits the message of the charging information obtaining request to the cloud 200 connected via the network 20. In the cloud 200 receiving the message of the charging information obtaining request, a cloud OS 210 obtains the message via a mediator 220 within the cloud 200, for example.

The cloud OS 110 of the cloud 100 manages the VM 131 within the cloud 100, and has charging information according to usage conditions of the VM 131. When the cloud OS 110 receives the message of the charging information obtaining request from the mediator 120, the cloud OS 110 returns the charging information of the VM 131 to the mediator 120. The mediator 120 transmits the reply from the cloud OS 110 to the message reply integrating section 127.

The cloud OS 210 of the cloud 200 manages a VM 231 within the cloud 200, and has charging information according to usage conditions of the VM 231. When the cloud OS 210 receives the message of the charging information obtaining request from the mediator 220, the cloud OS 210 returns the charging information of the VM 231 to the cloud 100 via the mediator 220. The reply from the cloud OS 210 is sent to the message reply integrating section 127 via the protocol converting section 123 within the mediator 120.

In a case where the message reply integrating section 127 performs reply message synchronization processing, the message reply integrating section 127 waits for the replies from the respective cloud OSes 110 and 210. When the message reply integrating section 127 then receives the replies from all of the cloud OSes 110 and 210, the message reply integrating section 127 integrates the reply messages from the cloud OSes 110 and 210, and outputs integrated charging information to the protocol converting section 123. The protocol converting section 123 transmits, to the VM 131, the output charging information as a reply to the charging information obtaining request.

The message reply integrating section 127 may also process the reply messages asynchronously. In a case where the message reply integrating section 127 processes the reply messages asynchronously, the message reply integrating section 127 outputs the charging information to the protocol converting section 123 each time the message reply integrating section 127 receives the reply from each of the cloud OSes 110 and 210. Each time the charging information is output from the message reply integrating section 127, the protocol converting section 123 transmits, to the VM 131, the charging information as a reply to the charging information obtaining request.

Thus, by specifying a VM by a mediator ID that may uniquely identify the VM within the multi-cloud system, it is possible to obtain the metric information of the VM irrespective of the cloud in which the VM is operating.

Detailed description will be made below of processing of transmission of a request message to each of the cloud OSes 110 and 210 by the mediator 120 in response to a metric information obtaining request and reply message reception processing.

Figure 12:
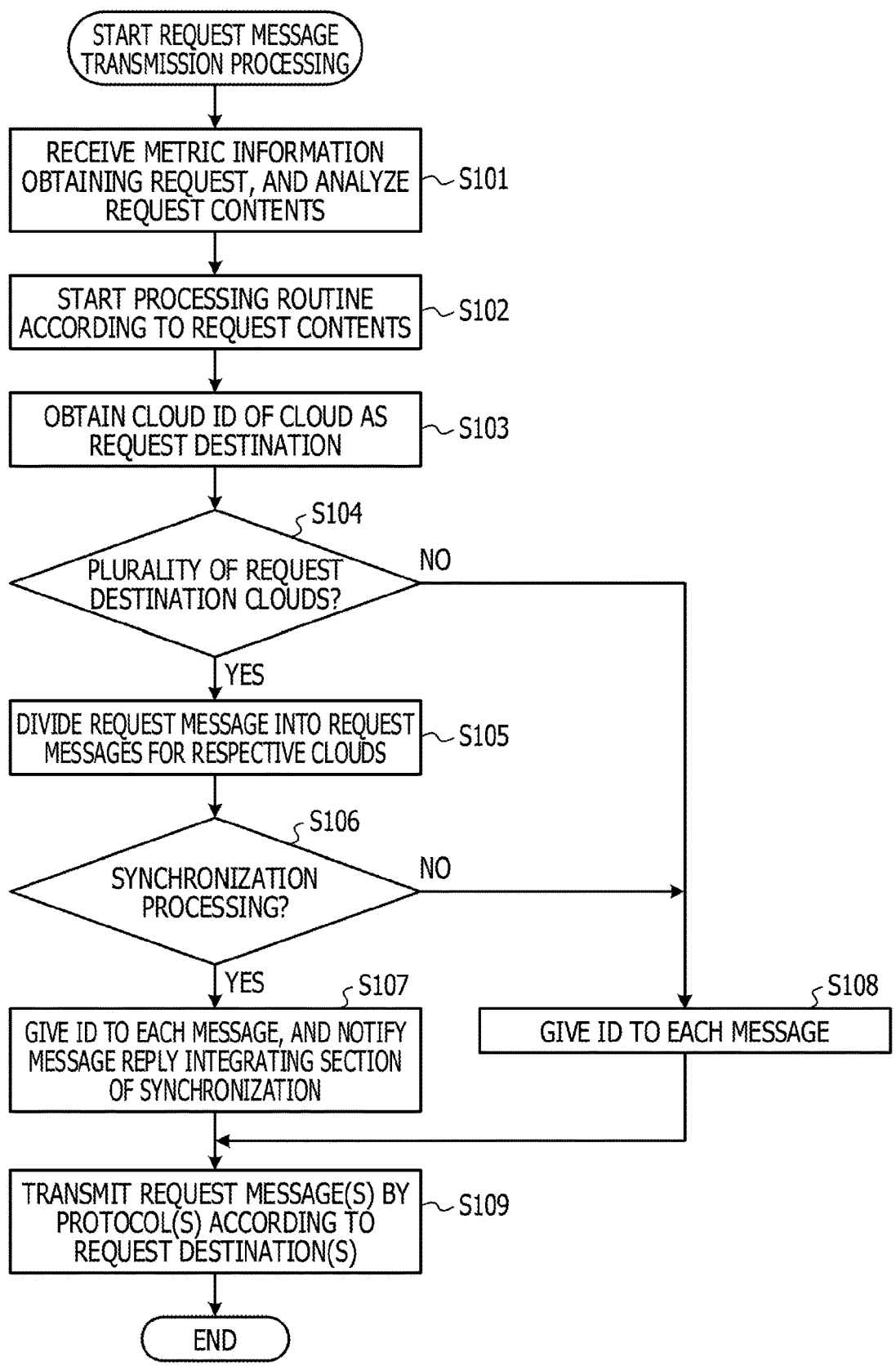
FIG. 12 is a flowchart illustrating an example of a procedure of request message transmission processing.

FIG. 12 is a flowchart illustrating an example of a procedure of request message transmission processing. The processing illustrated in FIG. 12 will be described in the following along step numbers.

[S101] The mediator 120 receives a request message indicating a request to obtain metric information from the VM 131. The request message, for example, indicates the tenant ID of the tenant to which the VM 131 belongs and the management target ID (CPU load or the like) of the service providing the metric information to be obtained. The request message is transmitted to the request message analyzing section 124 via the protocol converting section 123. The request message analyzing section 124 analyzes the request contents indicated in the request message.

[S102] The request message analyzing section 124 starts a processing routine according to the request contents. The request message analyzing section 124 then transmits, to the management information converting section 125, a request to obtain the cloud ID of the cloud having the metric information providing service according to the request contents.

[S103] The management information converting section 125 obtains the cloud ID of the cloud as a request destination, based on the mediator ID of the metric information providing service. For example, the management information converting section 125 refers to the ID correspondence conversion table 121a, and obtains the mediator ID of the metric information providing service corresponding to the metric information to be obtained. In a case where the metric information to be obtained is managed by a plurality of clouds, the mediator ID of each cloud is obtained. For example, when the request message is a request to obtain CPU loads of all of VMs of the tenant to which the VM 131 belongs, the mediator ID of each record having the tenant ID of the tenant and a management target ID indicating a CPU load is obtained from the ID correspondence conversion table 121a, The management information converting section 125 refers to the metric management table 122b, and obtains a cloud ID indicating a latest position of the metric information providing service corresponding to the obtained mediator ID and a metric ID corresponding to the cloud ID. The cloud ID indicating the latest position is a cloud ID registered last in association with the mediator ID. The management information converting section 125 transmits the obtained cloud ID and the obtained metric ID to the request message analyzing section 124. The request message analyzing section 124 transmits a request message specifying the cloud ID and the metric ID as a request destination to the destination/message ID managing section 126.

[S104] The destination/message ID managing section 126 determines whether or not there are a plurality of clouds as request destinations. When there are a plurality of clouds as request destinations, the destination/message ID managing section 126 advances the processing to S105. When there is only one cloud as a request destination, the destination/message ID managing section 126 advances the processing to S108.

[S105] The destination/message ID managing section 126 divides the request message into request messages for the respective request destination clouds. At this time, the destination/message ID managing section 126 converts each of the divided messages into a message format according to the request destination cloud. The request message of each cloud, for example, indicates the metric ID of the metric information providing service in the cloud. A mediator of the cloud receiving the request message identifies the metric information providing service as the request destination, based on the metric ID, and transmits the request message to the metric information providing service.

[S106] The destination/message ID managing section 126 determines whether or not synchronization processing is specified in the request message. When the synchronization processing is specified, the destination/message ID managing section 126 advances the processing to S107. When the synchronization processing is not specified, the destination/message ID managing section 126 advances the processing to S108.

[S107] The destination/message ID managing section 126 gives a message ID to each of the plurality of messages generated by the division, and notifies the message reply integrating section 127 of the synchronization processing. The destination/message ID managing section 126 thereafter advances the processing to S109.

[S108] The destination/message ID managing section 126 gives a message ID to each of the one or plurality of request messages.

[S109] The destination/message ID managing section 126 requests the protocol converting section 123 to transmit the one or plurality of request messages. The protocol converting section 123 transmits the one or plurality of request messages to the one or plurality of request destination clouds by one or a plurality of protocols according to the one or plurality of request destinations via the protocol converting section 123.

When the one or plurality of request messages are transmitted to the one or plurality of request destination clouds, one or a plurality of reply messages are returned from the one or plurality of clouds receiving the one or plurality of request messages.

Figure 13:
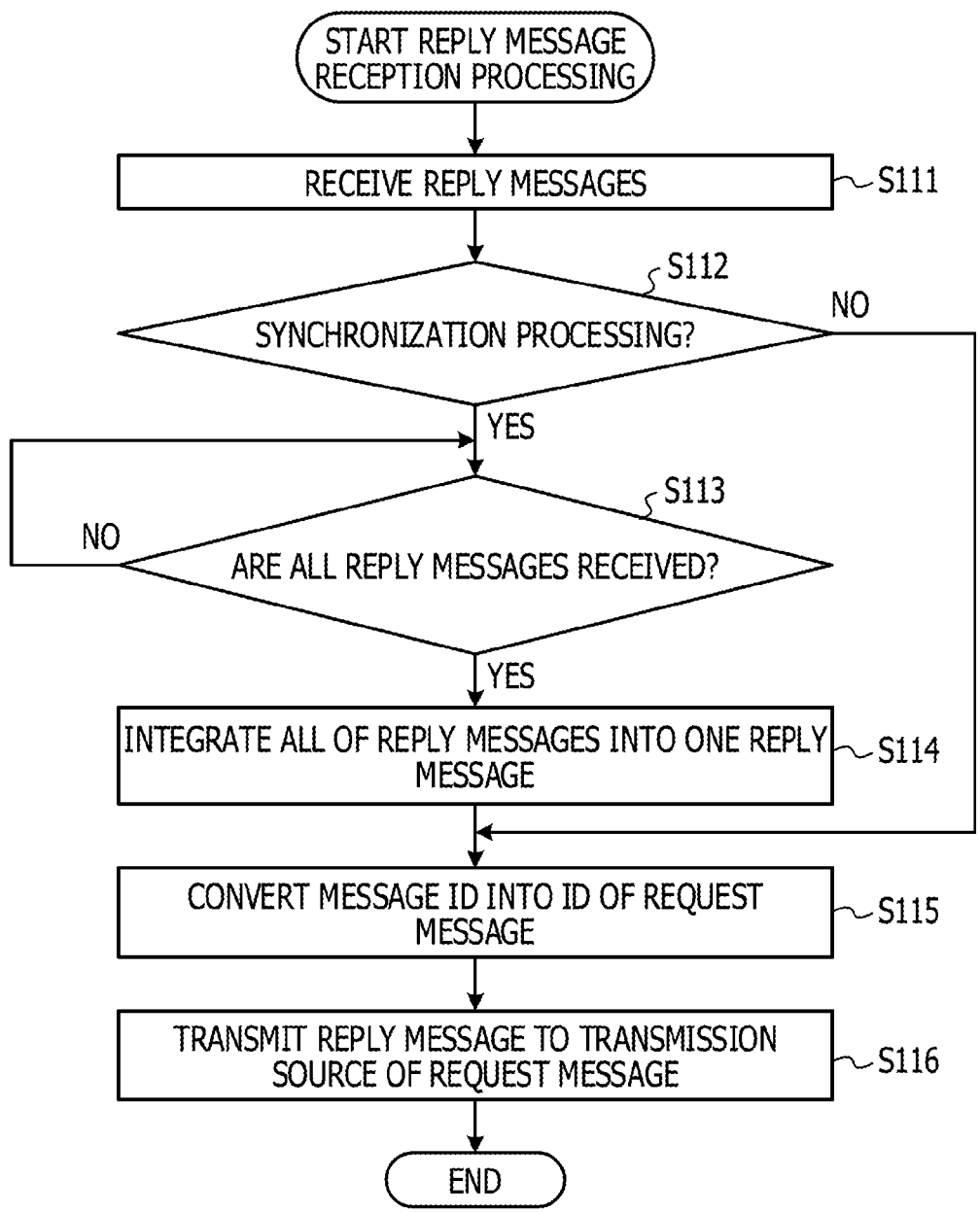
FIG. 13 is a flowchart illustrating an example of a procedure of reply message reception processing.

FIG. 13 is a flowchart illustrating an example of a procedure of reply message reception processing. The processing illustrated in FIG. 13 will be described in the following along step numbers.

[S111] The message reply integrating section 127 receives reply messages via the protocol converting section 123.

[S112] The message reply integrating section 127 determines whether or not to perform reply message synchronization processing. For example, when the message reply integrating section 127 receives a notification indicating the synchronization processing from the destination/message ID managing section 126, the message reply integrating section 127 determines that the synchronization processing is to be performed. When the synchronization processing is to be performed, the message reply integrating section 127 advances the processing to S113. When the synchronization processing is not to be performed, the message reply integrating section 127 advances the processing to S115.

[S113] The message reply integrating section 127 determines whether or not reply messages are received from all of clouds to which request messages are transmitted. When there is a reply message yet to be received, the message reply integrating section 127 repeats S113. When all of the reply messages are received, the message reply integrating section 127 advances the processing to S114.

[S114] The message reply integrating section 127 integrates all of the received reply messages into one reply message. For example, the message reply integrating section 127 generates one reply message that includes, in a payload of the reply message, all of data included in each of the received messages.

[S115] The message reply integrating section 127 converts the ID of the reply message into the ID of the request message.

[S116] The message reply integrating section 127 transmits the reply message to the transmission source of the request message.

Thus, even when the VM moves within the multi-cloud system, arbitrary metric information may be obtained by the mediator ID.

Processing of managing the mediator ID of a VM will next be described.

For example, when the mediator 120 generates a mediator ID, the mediator 120 notifies the mediator ID to other mediators, and the mediator ID of the added management target is shared between the mediators. In addition, the mediator 120 monitors communication contents of the VM 131, and creates a communication destination list of the VM 131. The mediator 120 uses the communication destination list of the VM 131 in a confirmation request as to whether or not the VM 131 may continue processing in a cloud as a movement destination when the mediator 120 moves the VM 131 to another cloud.

Figure 14:
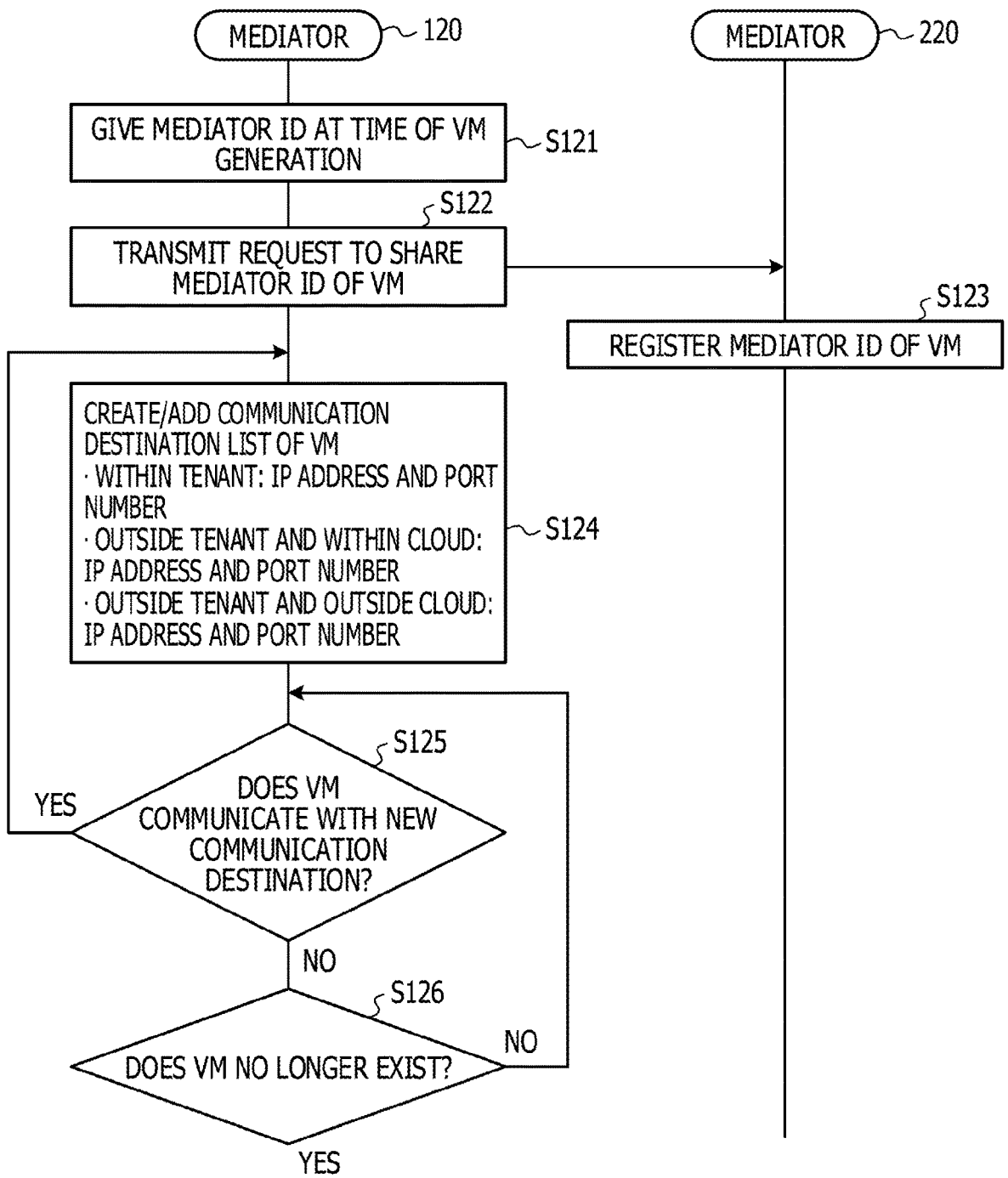
FIG. 14 is a sequence diagram illustrating an example of a procedure of processing of managing the mediator ID of a VM.

FIG. 14 is a sequence diagram illustrating an example of a procedure of processing of managing the mediator ID of a VM. The example of FIG. 14 represents processing of the mediator 120 within the cloud 100 and the mediator 220 within the other cloud 200 when the VM 131 is newly generated within the cloud 100.

When the VM 131 is generated, the mediator ID generating section 128 of the mediator 120 generates the mediator ID of the VM 131 (S121). The mediator ID generating section 128 transmits a mediator ID sharing request to the mediator 220 within the cloud 200 (S122). The mediator ID sharing request includes the mediator ID of the VM 131 and information used in generating the mediator ID. In response to the mediator ID sharing request, the mediator 220 registers the mediator ID of the VM 131 and the information used in generating the mediator ID in the ID correspondence conversion DB of the mediator 220 (S123).

The mediator 120 within the cloud 100 creates a communication destination list of the generated VM 131 (S124). The communication destination list is, for example, stored in the memory 102 or the storage device 103 in association with the identifier (mediator ID) of the VM 131. For example, the VM moving section 129 within the mediator 120 registers the IP address and port number of a communication partner of the VM 131 within the tenant to which the VM 131 belongs (including the IP address and port number of the VM 131 itself) in the communication destination list. In addition, the VM moving section 129 registers, in the communication destination list, the IP address and port number of a communication partner of the VM 131, the communication partner being outside the tenant to which the VM 131 belongs and belonging to the cloud 100. Further, the VM moving section 129 registers, in the communication destination list, the IP address and port number of a communication partner of the VM 131, the communication partner being outside the tenant to which the VM 131 belongs and belonging to the outside of the cloud 100.

The VM moving section 129 determines whether or not the VM communicates with a new communication partner (S125). For example, the VM moving section 129 determines that the VM 131 communicates with a new communication partner when the VM 131 performs packet transmission and reception with the communication partner having a set of an IP address and a port number not registered in the communication destination list. When the VM 131 communicates with a new communication partner, the VM moving section 129 advances the processing to S124, where the VM moving section 129 adds the set of the IP address and the port number of the new communication partner to the communication destination list.

When the VM 131 does not communicate with a new communication partner, the VM moving section 129 determines whether the VM 131 no longer exists (S126). For example, the VM moving section 129 determines that the VM 131 no longer exists when the VM 131 is deleted by the cloud OS 110. When the VM 131 still exists, the VM moving section 129 advances the processing to S125, and monitors whether or not the VM 131 communicates with a new communication partner. In addition, the VM moving section 129 ends the processing when the VM 131 no longer exists.

Thus, when the VM 131 is generated, the mediator ID that may uniquely identify the VM 131 is generated, and the mediator ID is retained by all of the mediators within the multi-cloud system. Further, communication partners of the VM 131 are managed in the communication destination list. When the VM 131 is moved so as to straddle clouds, it is possible to confirm whether communication with a communication partner of the VM 131 is likewise possible also in a cloud as a movement destination, based on the communication destination list.

Figure 15:
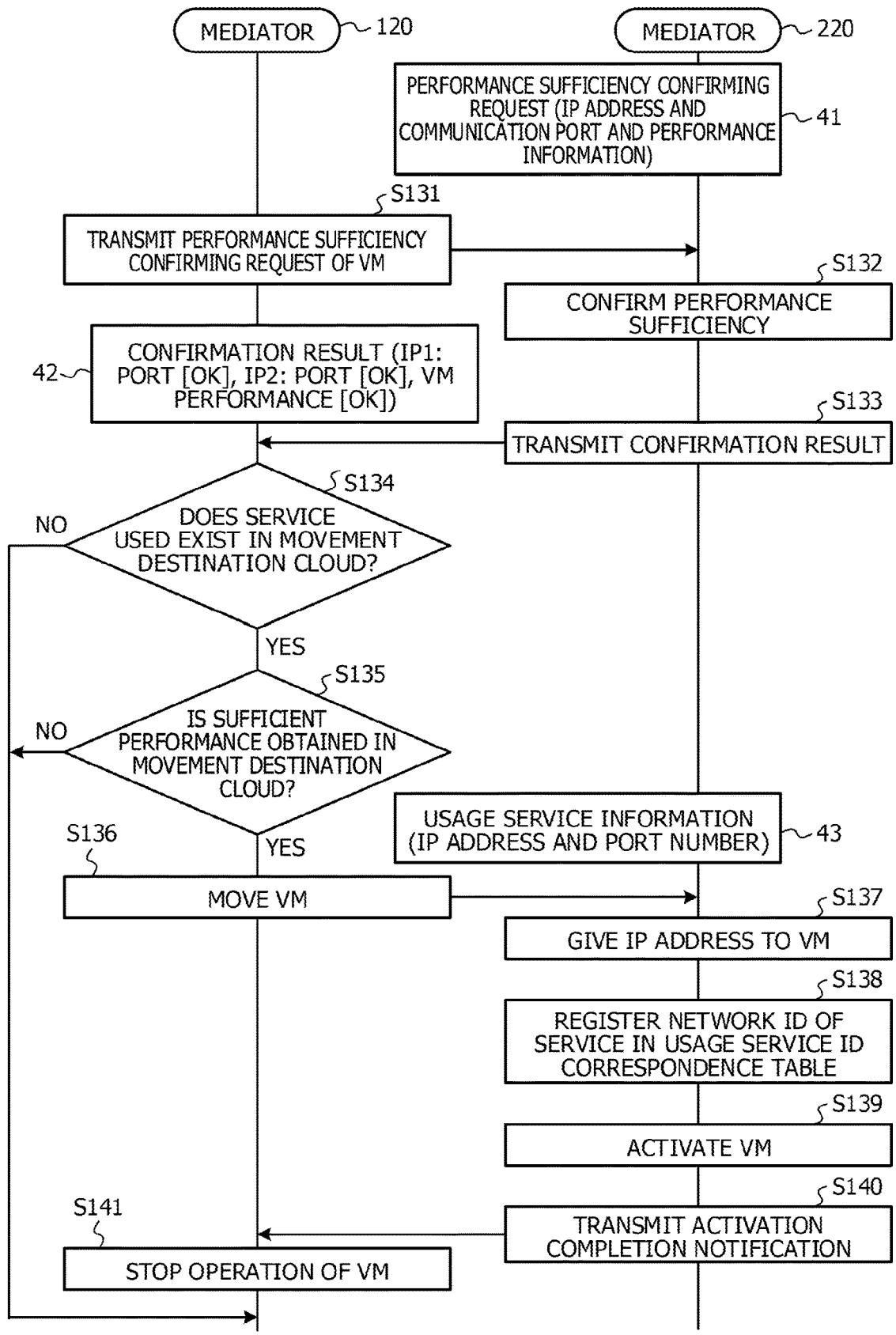
FIG. 15 is a sequence diagram illustrating an example of a procedure of VM movement processing.

FIG. 15 is a sequence diagram illustrating an example of a procedure of VM movement processing. The example of FIG. 15 assumes a case where a request to move the VM 131 to the cloud 200 is transmitted from the cloud OS 110 to the mediator 120. The mediator 120 transmits, to the mediator 220 within the cloud 200, a request to confirm that performance substantially equal to present performance may be ensured after the VM moving section 129 moves the VM 131 (performance sufficiency confirming request 41) (S131). The performance sufficiency confirming request 41, for example, includes a confirmation list. The confirmation list includes the IP address and communication port of a communication partner (a VM or a metric information providing service) of the VM 131, performance information of the VM 131, and the like. When it is known that a service within the tenant continues to be usable, for example, the confirmation list includes the IP address and port number of a transmission destination outside the tenant in the communication destination list created in S124 in FIG. 14. The performance information of the VM 131 includes information about an amount of resources to be used, such as the number of CPU cores, a memory space, and a storage space to be used to execute the VM 131.

In the mediator 220 receiving the performance sufficiency confirming request 41, the VM moving section within the mediator 220 performs performance sufficiency confirmation processing (S132). The performance sufficiency confirmation processing, for example, determines whether or not a service provided by the communication port indicated in the confirmation list may be accessed and whether or not performance substantially equal to or more than performance indicated by the performance information may be ensured.

The VM moving section within the mediator 220 transmits a confirmation result 42 of the performance sufficiency confirmation processing to the mediator 120 (S133). The confirmation result 42 indicates, for example, whether or not the service provided by the communication port indicated in the confirmation list may be accessed and whether or not performance substantially equal to or more than the performance indicated by the performance information may be ensured.

The VM moving section 129 of the mediator 120 determines whether or not the service used by the VM 131 within the cloud 100 exists also in the cloud 200, based on the confirmation result 42 (S134). For example, the VM moving section 129 determines that the service exists when the same kind of service may be accessed also in the cloud 200 via the port number for the service used by the VM 131 within the cloud 100. When all of services used by the VM 131 in the cloud 100 exist also in the cloud 200, the VM moving section 129 advances the processing to S135. In addition, when at least one of the services used by the VM 131 in the cloud 100 does not exist in the cloud 200, the VM moving section 129 ends the processing without moving the VM 131.

When all of the services may be provided also in the cloud 200 as the movement destination, the VM moving section 129 determines whether or not the VM 131 may obtain sufficient performance in the cloud 200 as the movement destination (S135). For example, the VM moving section 129 determines that sufficient performance may be obtained when the confirmation result 42 indicates sufficient performance as a result of confirmation of VM performance. When the VM 131 may obtain sufficient performance in the cloud 200 as the movement destination, the VM moving section 129 advances the processing to S136. In addition, when moving the VM 131 to the cloud 200 makes it difficult to obtain sufficient performance, the VM moving section 129 ends the processing without moving the VM 131.

When sufficient performance may be obtained even after the movement, the VM moving section 129 moves the VM 131 to the cloud 200 by performing migration processing (S136). At this time, the VM moving section 129 transmits, to the mediator 220 within the cloud 200, usage service information 43 indicating a set of the mediator ID of the VM 131 and the IP addresses and communication ports of the services used by the VM 131.

The mediator 220 of the cloud 200 gives an IP address within the cloud 200 to the VM after the movement (S137). At this time, the mediator 220 sets the IP address of the mediator 220 as a proxy for the VM after the movement. Further, the mediator 220 registers the IP addresses and port numbers indicated in the usage service information and the IP addresses and port numbers of the corresponding services within the cloud 200 in the usage service ID correspondence table in association with the mediator ID of the VM 131 (S138). Thereafter, the mediator 220 actives the moved VM 131 (S139). When the activation of the VM 131 is completed, the mediator 220 transmits an activation completion notification to the mediator 120 of the cloud 100 (S140).

Receiving the activation completion notification, the mediator 120 of the cloud 100 stops operation of the VM 131 in the cloud 100 (S141).

Thus, the VM 131 may be moved after it is confirmed that processing like that before the movement may be performed with like performance. Furthermore, when the VM 131 is moved, the mediator 220 of the movement destination registers correspondence relation between the IP addresses and port numbers of the services used at the movement source and the movement destination in the usage service ID correspondence table. Thus, when the VM 131 uses a service after the movement, an IP address and a port number specifying the service may be easily changed to an IP address and a port number corresponding to the movement destination cloud 200.

In the following, referring to FIG. 16, description will be made of an example of movement of the VM 131 in a case where the VM 131 is using a CPU load obtaining service.

FIG. 16 is a diagram illustrating an example of movement of the VM using the CPU load obtaining service. The mediator 120 of the cloud 100 moves the VM 131 to the cloud 200 (S151). A VM 131a having the same functions and performance as the VM 131 is thereby generated within the cloud 200. When the mediator 120 moves the VM 131, the mediator 120 transmits usage service information 43 to the mediator 220. The usage service information 43 indicates the IP address and port number of a communication port for obtaining a CPU load.

The mediator 220 gives an IP address (192.169.100.22) within the cloud 200 to the VM 131a after the movement (S152). At this time, the mediator 220 sets the IP address of the mediator 220 as a proxy server for the VM 131a, The mediator 220 then starts operation of the VM 131a (S153). When operation of the VM 131a is started, the VM 131a transmits an activation completion notification to the mediator 220 (S154).

The mediator 220 registers access destination correspondence relation for using the service at the movement source and the movement destination in the usage service ID correspondence table in association with the mediator ID of the VM 131a (S155). In a case where an IP address and a port number for obtaining the CPU load within the cloud 200 are "172.222.0.77: 9000," "(172.100.0.80: 8989)→ (172.222.0.77: 9000)" is registered in the usage service ID correspondence table. The created usage service ID correspondence table is retained in a memory, for example, in association with the mediator ID of the VM 131a.

For example, the mediator 220 refers to the ID correspondence conversion table possessed by the mediator 220 itself (same contents as the ID correspondence conversion table 121a of the mediator 120), and obtains the mediator ID of the CPU load obtaining service (management target ID is "CPU load") in each mediator. Next, the mediator 220 refers to the communication environment management table possessed by the mediator 220 itself (same contents as the communication environment management table 122c of the mediator 120), and obtains an IP address and a port number corresponding to the obtained mediator ID. The mediator 220 sets the IP address and port number of the CPU load obtaining service in the mediator 120 as a movement source IP address and port number, and sets the IP address and port number of the CPU load obtaining service in the mediator 220 as a movement destination IP address and port number. Then, the mediator 220 registers a set of the movement source IP address and port number and the movement destination IP address and port number in the usage service ID correspondence table possessed by the mediator 220 in association with the mediator ID of the moved VM 131.

When the mediator 220 receives the activation completion notification from the VM 131a, the mediator 220 transmits the activation completion notification to the mediator 120 of the movement source cloud 100 (S156). When the mediator 120 receives the activation completion notification, the mediator 120 performs operation stop control of the VM 131 (S157). As a result, operation of the VM 131 is stopped (S158).

Thereafter, the VM 131a operating within the cloud 200 outputs a CPU load request (S159). The VM 131a is operating in the same environment settings as when operating within the cloud 100. Therefore, the transmission destination of the CPU load request is addressed to the CPU load obtaining service in the cloud 100, and the destination is (172.100.0.80: 8989).

When the mediator 220 obtains the CPU load request, the mediator 220 converts the destination of the CPU load request from (172.100.0.80: 8989) to (172.222.0.77: 9000), based on the usage service ID correspondence table. Then, the mediator 220 transmits the CPU load request to the cloud OS 210, and thereby obtains CPU load information 44 from the cloud OS 210 (S160). The mediator 220 transmits the CPU load information 44 obtained from the cloud OS 210 to the VM 131a (S161).

Thus, the VM 131 may obtain CPU load information like that before the movement even after the VM 131 moves so as to straddle the clouds.

Description will next be made of an example in which after movement, the VM 131 communicates with another VM with which the VM 131 communicates before the movement.

FIG. 17 is a diagram illustrating an example of movement of the VM that performs inter-VM communication. The mediator 120 of the cloud 100 moves the VM 131 to the cloud 200 (S171). The mediator 220 gives an IP address (192.169.100.22) within the cloud 200 to the VM 131a after the movement (S172). The mediator 220 then starts operation of the VM 131a (S173). When the VM 131a starts operation, the VM 131a transmits an activation completion notification to the mediator 220 (S174).

When the mediator 220 receives the activation completion notification from the VM 131a, the mediator 220 transmits the activation completion notification to the mediator 120 of the movement source cloud 100 (S175). When the mediator 120 receives the activation completion notification, the mediator 120 performs operation stop control of the VM 131 (S176). As a result, operation of the VM 131 is stopped (S177).

Thereafter, the VM 131a transmits a packet to a VM 132 within the movement source cloud 100 (S178). The transmitted packet is received by the mediator 220.

The mediator 220 obtains a mediator ID corresponding to the IP address of the VM 131a that transmitted the packet from the communication environment management table possessed by the mediator 220 itself (same contents as the communication environment management table 122c of the mediator 120). The mediator 220 then transfers the packet to the VM 132 in the cloud 100 in which the VM 131 before the movement of the VM 131a was present based on the obtained mediator ID (S179). At this time, the mediator 220 changes the transmission source address of the packet from the address "192.169.100.22" of the VM 131a after the movement to the address "192.169.0.11" of the VM 131 before the movement.

The transferred packet is received by the mediator 120. The mediator 120 transfers the packet to the VM 132 (S180). The VM 132 receives the packet, and transmits a return packet having the address "192.169.0.11" of the VM 131 before the movement as a destination (S181). The return packet is received by the mediator 120.

The mediator 120 obtains the mediator ID of the VM 131 as the transmission destination of the return packet from the communication environment management table 122c, The mediator 120 then transfers the return packet to the VM 131a after the movement in the cloud 200, based on the obtained mediator ID (S182). At this time, the mediator 120 changes the transmission destination address of the return packet from the address "192.169.0.11" of the VM 131 before the movement to the address "192.169.100.22" of the VM 131a after the movement. In the cloud 200, the mediator 220 receives the return packet, and transfers the return packet to the VM 131a after the movement (S183).

As described above, according to the second embodiment, a globally uniquely identifiable mediator ID is given to an element as a management target in a cloud, the element being a VM, a metric information providing service, or the like. Thus, even when VMs are moved so as to straddle clouds, mediators may uniquely identify each VM, and easily manage the IP address and the like of each VM in each of a plurality of clouds. As a result, a moved VM may perform information obtainment and inter-VM communication like those before the movement.

There are global address notation methods other than mediator IDs. However, each of the methods has the following problems, and is thus not practical in the multi-cloud system.

There is a fully qualified domain name (FQDN) as a first example of a global address. With the FQDN, it is difficult to make a representation up to the IP address of a VM within a cloud. In addition, the notation of the FQDN is corrected when the VM moves to another cloud, so that it is difficult to maintain sameness when the VM moves so as to straddle clouds.

As a second example of a global address, there is an interface ID of IPV6. Communication based on the interface ID is limited to the inside of a local area network (LAN). In addition, the interface ID of IPV6 is generated from a media access control (MAC) address. Thus, when a VM moves to another cloud, the MAC address of the VM may be corrected, and the interface ID may be corrected.

As a third example of a global address, there is Mobile IP. In Mobile IP, in a case where the instance ID of a partner is to be obtained, when an access IP address for obtaining the instance ID of the VM in a cloud in which the VM is operating is unknown, it is difficult to obtain the instance ID, and it is difficult to perform communication. Even if the access IP address for obtaining the instance ID is registered in an agent disclosed to the outside, an obtaining access application programming interface (API) and a protocol therefor may differ between clouds. In this case, it is difficult to accommodate differences in the obtaining access API and the like by an application or the agent.

As a problem common to the three examples described above, it is difficult to access the IP address of a representational state transfer (REST) API accessing metric information from the outside, and it may be difficult to obtain information via the REST API so as to straddle clouds. It is difficult to register the IP address in the agent, express the IP address by FQDN, or directly access the IP address by IPV6.

According to the second embodiment, each VM or metric information providing service is given a mediator ID as a global identifier, and the mediator ID is managed by the mediators of respective clouds. Therefore, even when a VM moves so as to straddle clouds, the VM may continue to be identified uniquely, and information about each VM may be managed properly.

Other Embodiments

In the first and second embodiments, description has been made of a case where there are two clouds. However, the processing illustrated in the first and second embodiments is likewise applicable also to multi-cloud systems in which there are three or more clouds.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising: storing a port number of a first service used by a first virtual machine executed within a first cloud computing system in association with an identifier of the first virtual machine; when receiving a request to move the first virtual machine to a second cloud computing system, transmitting a confirmation request as to whether or not a second service corresponding to the port number of the first service is enabled to be used in the second cloud computing system to the second cloud computing system, the confirmation request specifying the port number of the first service; and moving the first virtual machine to the second cloud computing system when receiving a reply indicating that the second service is enabled to be used from the second cloud computing system in response to the confirmation request.

2. The storage medium according to claim 1, wherein the process further comprises: when a second virtual machine executed within the second cloud computing system moves to the first cloud computing system, obtaining a second address for access to the second service used by the second virtual machine from the second cloud computing system; storing a correspondence table indicating correspondence relation between a first address for access to the first service providing a same kind of service as the second service within the first cloud computing system and the obtained second address; and when receiving a service providing request specifying the second address from the second virtual machine after movement, changing a transmission destination of the service providing request to the first address, based on the correspondence table.

3. The storage medium according to claim 1, wherein the process further comprises: obtaining a fourth address of the first virtual machine after movement within the second cloud computing system from the second cloud computing system; storing a third address of the first virtual machine within the first cloud computing system and the fourth address in association with each other; and after the first virtual machine moves to the second cloud computing system, changing a transmission destination of a packet generated within the first cloud computing system and having the third address as the transmission destination to the fourth address, and transferring the packet after the changing of the transmission destination to the second cloud computing system.

4. The storage medium according to claim 1, wherein the process further comprises: when a third virtual machine is generated within the second cloud computing system, obtaining a fifth address of the third virtual machine within the second cloud computing system from the second cloud computing system; when a fourth virtual machine is generated within the second cloud computing system, obtaining a sixth address of the fourth virtual machine within the second cloud computing system from the second cloud computing system; when the third virtual machine moves to the first cloud computing system, storing a seventh address of the third virtual machine after movement within the first cloud computing system in association with the fifth address of the third virtual machine before the movement; and when the third virtual machine after the movement outputs a packet having the sixth address of the fourth virtual machine as a transmission destination, changing an address of a transmission source of the output packet to the fifth address, and transferring the packet after the changing of the transmission source to the second cloud computing system.

5. The storage medium according to claim 1, wherein the process further comprises: when the first virtual machine before movement outputs a multiplex service providing request specifying the first service and the second service, dividing the multiplex service providing request into a first request having an address of the first service as a transmission destination and a second request having an address of the second service as a transmission destination; and transmitting the first request to the first service within the first cloud computing system, and transmitting the second request to the second cloud computing system.

6. The storage medium according to claim 1, wherein the process further comprises: waiting for responses until receiving a first response to the first request and a second response to the second request; and when receiving the first response and the second response, integrating the first response and the second response into one response, and returning the response to the first virtual machine.

7. A multi-cloud operating method executed by a computer, the multi-cloud operating method comprising: storing a port number of a first service used by a first virtual machine executed within a first cloud computing system in association with an identifier of the first virtual machine; receiving a request to move the first virtual machine to a second cloud computing system, transmitting, in response to the received request, a confirmation request as to whether or not a second service corresponding to the port number of the first service is enabled to be used in the second cloud computing system to the second cloud computing system, the confirmation request specifying the port number of the first service; moving the first virtual machine to the second cloud computing system when receiving a reply indicating that the second service is enabled to be used from the second cloud computing system in response to the confirmation request; and moving, in response to the received reply, the first virtual machine to the second cloud computing system.

8. The multi-cloud operating method according to claim 7, wherein the method further comprises: when a second virtual machine executed within the second cloud computing system moves to the first cloud computing system, obtaining a second address for access to the second service used by the second virtual machine from the second cloud computing system; storing a correspondence table indicating correspondence relation between a first address for access to the first service providing a same kind of service as the second service within the first cloud computing system and the obtained second address; and when receiving a service providing request specifying the second address from the second virtual machine after movement, changing a transmission destination of the service providing request to the first address, based on the correspondence table.

9. The multi-cloud operating method according to claim 7, wherein the method further comprises: obtaining a fourth address of the first virtual machine after movement within the second cloud computing system from the second cloud computing system; storing a third address of the first virtual machine within the first cloud computing system and the fourth address in association with each other; and after the first virtual machine moves to the second cloud computing system, changing a transmission destination of a packet generated within the first cloud computing system and having the third address as the transmission destination to the fourth address, and transferring the packet after the changing of the transmission destination to the second cloud computing system.

10. The multi-cloud operating method according to claim 7, wherein the method further comprises:
obtaining a fifth address of a third virtual machine within the second cloud computing system from the second cloud computing system; when a fourth virtual machine is generated within the second cloud computing system, obtaining a sixth address of the fourth virtual machine within the second cloud computing system from the second cloud computing system; when the third virtual machine moves to the first cloud computing system, storing a seventh address of the third virtual machine after movement within the first cloud computing system in association with the fifth address of the third virtual machine before the movement; and when the third virtual machine after the movement outputs a packet having the sixth address of the fourth virtual machine as a transmission destination, changing an address of a transmission source of the output packet to the fifth address, and transferring the packet after the changing of the transmission source to the second cloud computing system.

11. The multi-cloud operating method according to claim 7, wherein the method further comprises: when the first virtual machine before movement outputs a multiplex service providing request specifying the first service and the second service, dividing the multiplex service providing request into a first request having an address of the first service as a transmission destination and a second request having an address of the second service as a transmission destination; and transmitting the first request to the first service within the first cloud computing system, and transmitting the second request to the second cloud computing system.

12. The multi-cloud operating method according to claim 7, wherein the method further comprises: waiting for responses until receiving a first response to the first request and a second response to the second request; and when receiving the first response and the second response, integrating the first response and the second response into one response, and returning the response to the first virtual machine.

13. An operation managing device, comprising a memory; and a processor coupled to the memory and configured to: store a port number of a first service used by a first virtual machine executed within a first cloud computing system in association with an identifier of the first virtual machine, when receiving a request to move the first virtual machine to a second cloud computing system, transmit a confirmation request as to whether or not a second service corresponding to the port number of the first service is enabled to be used in the second cloud computing system to the second cloud computing system, the confirmation request specifying the port number of the first service, and move the first virtual machine to the second cloud computing system when receiving a reply indicating that the second service is enabled to be used from the second cloud computing system in response to the confirmation request.

* * * * *